US012726541B2

(12) United States Patent
Matsuda et al.

(10) Patent No.: US 12,726,541 B2
(45) Date of Patent: Sep. 1, 2026

(54) FIRST ELECTRIC DEVICE, SECOND ELECTRIC DEVICE, AND CONTROL SYSTEM OF HUMAN-POWERED VEHICLE

(71) Applicant: SHIMANO INC., Sakai City (JP)

(72) Inventors: Hiroshi Matsuda, Sakai City (JP); Hiroko Matsubayashi, Sakai City (JP); Toru Takayanagi, Sakai City (JP); Tomohiro Kondo, Sakai City (JP)

(73) Assignee: SHIMANO INC., Sakai (JP)

( * ) Notice: Subject to any disclaimer, the term of this patent is extended or adjusted under 35 U.S.C. 154(b) by 465 days.

(21) Appl. No.: 18/356,249

(22) Filed: Jul. 21, 2023

(65) Prior Publication Data

US 2025/0030765 A1 Jan. 23, 2025

(51) Int. Cl.

| | |
|---|---|
| ***H04W 76/14*** | (2018.01) |
| ***B62J 6/165*** | (2020.01) |
| ***B62J 45/20*** | (2020.01) |
| ***B62J 50/20*** | (2020.01) |
| ***H04L 67/12*** | (2022.01) |
| *B62J 43/30* | (2020.01) |
| *B62M 9/122* | (2010.01) |

(52) U.S. Cl.

CPC .............. *H04L 67/12* (2013.01); *B62J 6/165* (2020.02); *B62J 45/20* (2020.02); *B62J 50/20* (2020.02); *H04W 76/14* (2018.02); *B62J 43/30* (2020.02); *B62M 9/122* (2013.01)

(58) Field of Classification Search

CPC ..... H04L 67/12; H04L 67/63; H04L 65/1069; H04L 67/56; B62J 6/165; B62J 45/20; B62J 50/20; B62J 43/30; B62J 2001/085; B62J 45/00; H04W 76/14; H04W 84/12; H04W 4/70; B62M 9/122; B62M 9/132; B62M 25/08; Y02D 30/70

See application file for complete search history.

(56) References Cited

U.S. PATENT DOCUMENTS

| | | | | |
|---|---|---|---|---|
| 9,540,071 | B2 | 1/2017 | Jordan et al. | |
| 9,773,401 | B1 * | 9/2017 | Auvenshine | H04W 4/38 |
| 10,392,078 | B2 * | 8/2019 | Jordan | B62M 9/132 |
| 10,667,316 | B1 * | 5/2020 | Inoue | H04W 76/15 |
| 12,432,797 | B2 * | 9/2025 | Kindo | H04W 4/80 |
| 2015/0177362 | A1 | 6/2015 | Gutierrez et al. | |
| 2016/0205423 | A1 * | 7/2016 | Gobara | H04N 21/47214<br>725/115 |

(Continued)

*Primary Examiner* — Cindy Trandai

(74) *Attorney, Agent, or Firm* — MORI & WARD, LLP

(57) ABSTRACT

A first electric device comprises a first wireless communicator, an electric actuator, and a first electronic controller. The first electronic controller is configured to control the electric actuator to generate the actuation force based on a user input received by the second electric device in a connection state where the first wireless communicator is paired with the second wireless communicator and where the first wireless communicator is wirelessly connected to the second wireless communicator. The first electronic controller is configured to control the first wireless communicator to reconnect to the second wireless communicator based on the user input received by the second electric device in a disconnection state where the first wireless communicator is paired with the second wireless communicator and where the first wireless communicator is wirelessly disconnected from the second wireless communicator.

25 Claims, 10 Drawing Sheets

(56) References Cited

U.S. PATENT DOCUMENTS

| | | | | |
|---|---|---|---|---|
| 2016/0257269 | A1* | 9/2016 | Watarai | B62J 43/13 |
| 2017/0012455 | A1 | 1/2017 | Kato et al. | |
| 2018/0257737 | A1* | 9/2018 | Komatsu | B62K 25/10 |
| 2018/0330348 | A1* | 11/2018 | Uhr | G06Q 20/4014 |
| 2019/0241236 | A1* | 8/2019 | Lin | B62M 9/132 |
| 2020/0298011 | A1* | 9/2020 | Helvick | H04W 76/30 |
| 2021/0070390 | A1* | 3/2021 | Komada | B62M 9/132 |
| 2021/0144634 | A1* | 5/2021 | Kincaid | H04W 52/38 |
| 2021/0221467 | A1 | 7/2021 | Suzuki et al. | |
| 2022/0081068 | A1* | 3/2022 | Nozaki | B62M 9/122 |
| 2022/0198856 | A1* | 6/2022 | Sobue | H04W 4/40 |
| 2022/0210262 | A1* | 6/2022 | Popkave | G06F 3/04883 |
| 2023/0092687 | A1* | 3/2023 | Berggren | H04W 52/0229 370/329 |
| 2023/0109945 | A1 | 4/2023 | Garnica | |
| 2023/0309163 | A1* | 9/2023 | Mitty | H04L 65/1069 |
| 2024/0015007 | A1* | 1/2024 | Singh | H04L 9/0825 |
| 2025/0072523 | A1* | 3/2025 | Bruton | G01S 11/06 |
| 2025/0214674 | A1* | 7/2025 | Warmer | B62M 6/45 |

* cited by examiner

FIRST ELECTRIC DEVICE, SECOND ELECTRIC DEVICE, AND CONTROL SYSTEM OF HUMAN-POWERED VEHICLE

BACKGROUND

Technical Field

The present invention relates to a first electric device, a second electric device, and a control system of a human-powered vehicle.

Background Information

A human-powered vehicle includes an electric unit configured to be powered by an electric power supply. One of objects of the present disclosure is to improve the usability of the electric unit.

SUMMARY

In accordance with a first aspect of the present invention, a first electric device of a human-powered vehicle comprises a first wireless communicator, an electric actuator, and a first electronic controller. The first wireless communicator is configured to wirelessly communicate with a second wireless communicator of a second electric device. The electric actuator is configured to generate an actuation force. The first electronic controller is configured to control the electric actuator to generate the actuation force based on a user input received by the second electric device in a connection state where the first wireless communicator is paired with the second wireless communicator and where the first wireless communicator is wirelessly connected to the second wireless communicator. The first electronic controller is configured to control the first wireless communicator to reconnect to the second wireless communicator based on the user input received by the second electric device in a disconnection state where the first wireless communicator is paired with the second wireless communicator and where the first wireless communicator is wirelessly disconnected from the second wireless communicator.

With the first electric device according to the first aspect, it is possible to reconnect, using the user input, the first wireless communicator and the second wireless communicator which are wirelessly disconnected. Thus, it is possible to improve the usability of the first electric device.

In accordance with a second aspect of the present invention, the first electric device according to the first aspect is configured so that the first electronic controller is configured to control the first wireless communicator to wirelessly transmit a first signal based on the user input received by the second electric device in the disconnection state.

With the first electric device according to the second aspect, it is possible to reconnect, using the first signal, the first wireless communicator and the second wireless communicator which are wirelessly disconnected. Thus, it is possible to reliably improve the usability of the first electric device.

In accordance with a third aspect of the present invention, the first electric device according to the second aspect is configured so that the second wireless communicator is configured to wirelessly transmit a second signal based on the user input. The first electronic controller is configured to control the first wireless communicator to wirelessly transmit the first signal based on the second signal in the disconnection state. The first electronic controller is configured to control the first wireless communicator to reconnect to the second wireless communicator based on the second signal.

With the first electric device according to the third aspect, it is possible to reconnect, using the second signal, the first wireless communicator and the second wireless communicator which are wirelessly disconnected. Thus, it is possible to more reliably improve the usability of the first electric device.

In accordance with a fourth aspect of the present invention, the first electric device according to any one of the first to third aspects is configured so that the first electronic controller includes a first memory configured to store second pairing information of the second electric device received during pairing.

With the first electric device according to the fourth aspect, it is possible to establish wireless communication between the first wireless communicator and the second wireless communicator using the second pairing information. Thus, it is possible to reliably improve the usability of the first electric device.

In accordance with a fifth aspect of the present invention, the first electric device according to any one of the first to fourth aspects is configured so that the first wireless communicator is configured to wirelessly communicate with the second wireless communicator of the second electric device using a communication protocol in the connection state. The second wireless communicator is configured to wirelessly communicate with a third wireless communicator of a third electric device using the communication protocol in an additional connection state where the second wireless communicator is paired with the third wireless communicator and where the second wireless communicator is wirelessly connected to the third wireless communicator.

With the first electric device according to the fifth aspect, it is possible to smoothly establish wireless communication between the first wireless communicator and the second wireless communicator using the communication protocol. Thus, it is possible to reliably improve the usability of the first electric device.

In accordance with a sixth aspect of the present invention, the first electric device according to any one of the first to fifth aspects is configured so that the first wireless communicator is configured to be wirelessly disconnected from the second wireless communicator based on a disconnection operation performed for at least one of the first electric device and the second electric device.

With the first electric device according to the sixth aspect, it is possible to disconnect the first wireless communicator and the second wireless communicator based on the disconnection operation. However, it is possible to reconnect, using the user input, the first wireless communicator and the second wireless communicator which are wirelessly disconnected. Thus, it is possible to reliably improve the usability of the first electric device.

In accordance with a seventh aspect of the present invention, a second electric device of a human-powered vehicle comprises a second wireless communicator, a user interface, and a second electronic controller. The second wireless communicator is configured to wirelessly communicate with a first wireless communicator of a first electric device using a communication protocol. The second wireless communicator is configured to wirelessly communicate with a third wireless communicator of a third electric device using the communication protocol. The user interface is configured to receive a user input. The second electronic controller is configured to control the second wireless communicator to reconnect to the first wireless communicator based on the user input in a disconnection state where the second wireless communicator is paired with the first wireless communicator and where the second wireless communicator is wirelessly disconnected from the first wireless communicator. The second electronic controller is configured to control the second wireless communicator to restrict connecting to the third wireless communicator based on the user input in an additional disconnection state where the second wireless communicator is paired with the third wireless communicator and where the second wireless communicator is wirelessly disconnected from the third wireless communicator.

With the second electric device according to the seventh aspect, it is possible to restrict the second wireless communicator and the third wireless communicator from being wirelessly connected unintentionally. Thus, it is possible to improve the usability of the second electric device.

In accordance with an eighth aspect of the present invention, the second electric device according to the seventh aspect is configured so that the second electronic controller is configured to control the second wireless communicator to wirelessly transmit a second signal to the first electric device based on the user input received by the user interface in the disconnection state.

With the second electric device according to the eighth aspect, it is possible to control the first electric device using the second signal in the disconnection state. Thus, it is possible to reliably improve the usability of the second electric device.

In accordance with a ninth aspect of the present invention, the second electric device according to the seventh or eighth aspect is configured so that the second electronic controller is configured to control the second wireless communicator to reconnect to the first wireless communicator based on a first signal wirelessly transmitted from the first wireless communicator of the first electric device in the disconnection state.

With the second electric device according to the ninth aspect, it is possible to reconnect the first wireless communicator and the second wireless communicator using the first signal. Thus, it is possible to reliably improve the usability of the second electric device.

In accordance with a tenth aspect of the present invention, the second electric device according to any one of the seventh to ninth aspects is configured so that the user interface is configured to receive an additional user input different from the user input. The second electronic controller is configured to control the second wireless communicator to restrict connecting to the first wireless communicator based on the additional user input received by the user interface in the disconnection state.

With the second electric device according to the tenth aspect, it is possible to restrict the first wireless communicator and the second wireless communicator from being wirelessly connected unintentionally in the disconnection state. Thus, it is possible to reliably improve the usability of the second electric device.

In accordance with an eleventh aspect of the present invention, the second electric device according to the tenth aspect is configured so that the second wireless communicator is configured to restrict connecting to the third wireless communicator based on the additional user input in a connection state where the second wireless communicator is paired with the first wireless communicator and where the second wireless communicator is wirelessly connected to the first wireless communicator.

With the second electric device according to the eleventh aspect, it is possible to restrict the second wireless communicator and the third wireless communicator from being wirelessly connected unintentionally in the connection state. Thus, it is possible to reliably improve the usability of the second electric device.

In accordance with a twelfth aspect of the present invention, the second electric device according to the tenth or eleventh aspect is configured so that the second wireless communicator is configured to restrict connecting to the first wireless communicator based on the user input in the additional connection state.

With the second electric device according to the twelfth aspect, it is possible to restrict the first wireless communicator and the second wireless communicator from being wirelessly connected unintentionally in the additional connection state. Thus, it is possible to more reliably improve the usability of the second electric device.

In accordance with a thirteenth aspect of the present invention, the second electric device according to any one of the tenth to twelfth aspects is configured so that the second wireless communicator is configured to be wirelessly disconnected from the third wireless communicator based on an additional disconnection operation performed for at least one of the second electric device and the third electric device.

With the second electric device according to the thirteenth aspect, it is possible to disconnect the second wireless communicator and the third wireless communicator based on the additional disconnection operation. Thus, it is possible to reliably improve the usability of the second electric device.

In accordance with a fourteenth aspect of the present invention, the second electric device according to any one of the tenth to thirteenth aspects is configured so that the second electronic controller is configured to control, based on a pairing request input, the second wireless communicator to wirelessly transmit a pairing request signal indicating a request to start pairing between the first electric device and the second electric device. The pairing request input is the same manner as the additional user input.

With the second electric device according to the fourteenth aspect, it is possible to start pairing between the first electric device and the second electric device using the pairing request input. Thus, it is possible to reliably improve the usability of the second electric device.

In accordance with a fifteenth aspect of the present invention, the second electric device according to any one of the tenth to fourteenth aspects is configured so that the second electronic controller is configured to control the second wireless communicator to reconnect to the third wireless communicator based on the additional user input in the additional disconnection state.

With the second electric device according to the fifteenth aspect, it is possible to reconnect the second wireless communicator and the third wireless communicator using the additional user input. Thus, it is possible to reliably improve the usability of the second electric device.

In accordance with a sixteenth aspect of the present invention, the second electric device according to any one of the seventh to fifteenth aspects is configured so that the second wireless communicator is configured to be in at least one of the disconnection state and the additional disconnection state.

With the second electric device according to the sixteenth aspect, it is possible to disconnect the second wireless communicator from both the first wireless communicator and the third wireless communicator. Thus, it is possible to select at least one of the first wireless communicator and the third wireless communicator as a wireless communicator which is to be wirelessly connected to the second wireless communicator. Accordingly, it is possible to reliably improve the usability of the second electric device.

In accordance with a seventeenth aspect of the present invention, the second electric device according to any one of the seventh to sixteenth aspects is configured so that the second electronic controller includes a second memory configured to store first pairing information of the first electric device received during pairing. A state where the second wireless communicator is paired with the first wireless communicator includes a state where the second memory stores the first pairing information.

With the second electric device according to the seventeenth aspect, it is possible to establish wireless communication between the first wireless communicator and the second wireless communicator using the second pairing information. Thus, it is possible to reliably improve the usability of the second electric device.

In accordance with an eighteenth aspect of the present invention, the second electric device according to the seventeenth aspect is configured so that the second electronic controller is configured to control the second wireless communicator to reconnect the first wireless communicator of the first electric device based on the user input in the disconnection state where the second memory stores the first pairing information and where the second wireless communicator is wirelessly disconnected from the first wireless communicator.

With the second electric device according to the eighteenth aspect, it is possible to reconnect the first wireless communicator and the second wireless communicator which are wirelessly disconnected using the user input. Thus, it is possible to reliably improve the usability of the second electric device.

In accordance with a nineteenth aspect of the present invention, the second electric device according to the seventeenth or eighteenth aspect is configured so that the second electronic controller is configured to control the second wireless communicator to restrict connecting to the third wireless communicator based on the user input in the disconnection state where the second memory stores the first pairing information, where the second wireless communicator is wirelessly disconnected from the third wireless communicator, and where a third electric device stores the second pairing information.

With the second electric device according to the nineteenth aspect, it is possible to restrict the second wireless communicator and the third wireless communicator from being wirelessly connected unintentionally. Thus, it is possible to reliably improve the usability of the second electric device.

In accordance with a twentieth aspect of the present invention, the second electric device according to any one of the seventeenth to nineteenth aspects is configured so that the second memory is configured to store the first pairing information of the first electric device received during pairing executed between the first electric device and the second electric device. The second memory is configured to store third pairing information of the third electric device received during pairing executed between the second electric device and the third electric device.

With the second electric device according to the twentieth aspect, it is possible to establish wireless communication between the second wireless communicator and each of the first wireless communicator and the third wireless communicator. Thus, it is possible to reliably improve the usability of the second electric device.

In accordance with a twenty-first aspect of the present invention, the second electric device according to any one of the seventh to twentieth aspects is configured so that the second electronic controller is configured to control the second wireless communicator to execute pairing between the first wireless communicator and the second wireless communicator via the third electric device.

With the second electric device according to the twenty-first aspect, it is possible to establish wireless communication between the first wireless communicator and the second wireless communicator using the third electric device. Thus, it is possible to reliably improve the usability of the second electric device.

In accordance with a twenty-second aspect of the present invention, the second electric device according to any one of the seventh to twenty-first aspects is configured so that the second electronic controller is configured to execute pairing between the first wireless communicator and the second wireless communicator without the third electric device.

With the second electric device according to the twenty-second aspect, it is possible to establish wireless communication between the first wireless communicator and the second wireless communicator without the third electric device. Thus, it is possible to reliably improve the usability of the second electric device.

In accordance with a twenty-third aspect of the present invention, the second electric device according to any one of the seventh to twenty-second aspects is configured so that the third electric device includes at least one of a smartphone and a cycle computer.

With the second electric device according to the twenty-third aspect, it is possible to reliably improve the usability of the second electric device using the third electric device.

In accordance with a twenty-fourth aspect of the present invention, a control system of a human-powered vehicle comprises a first electric device and the second electric device according to any one of the seventh to twenty-third aspects. The first electric device comprises a first wireless communicator and an electric actuator. The first wireless communicator is configured to wirelessly communicate with the second wireless communicator of the second electric device. The electric actuator is configured to generate an actuation force.

With the control system according to the twenty-fourth aspect, it is possible to operate the electric actuator using the second electric device. Thus, it is possible to improve the usability of the second electric device.

In accordance with a twenty-fifth aspect of the present invention, the first electric device according to the twenty-fourth aspect is configured so that the first electric device is configured to be mounted to a vehicle body of the human-powered vehicle. The second electric device is configured to be mounted to the vehicle body of the human-powered vehicle.

With the control system according to the twenty-fifth aspect, it is possible to arrange the first electric device and the second electric device in positions suitable for using the first electric device and the second electric device in the human-powered vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
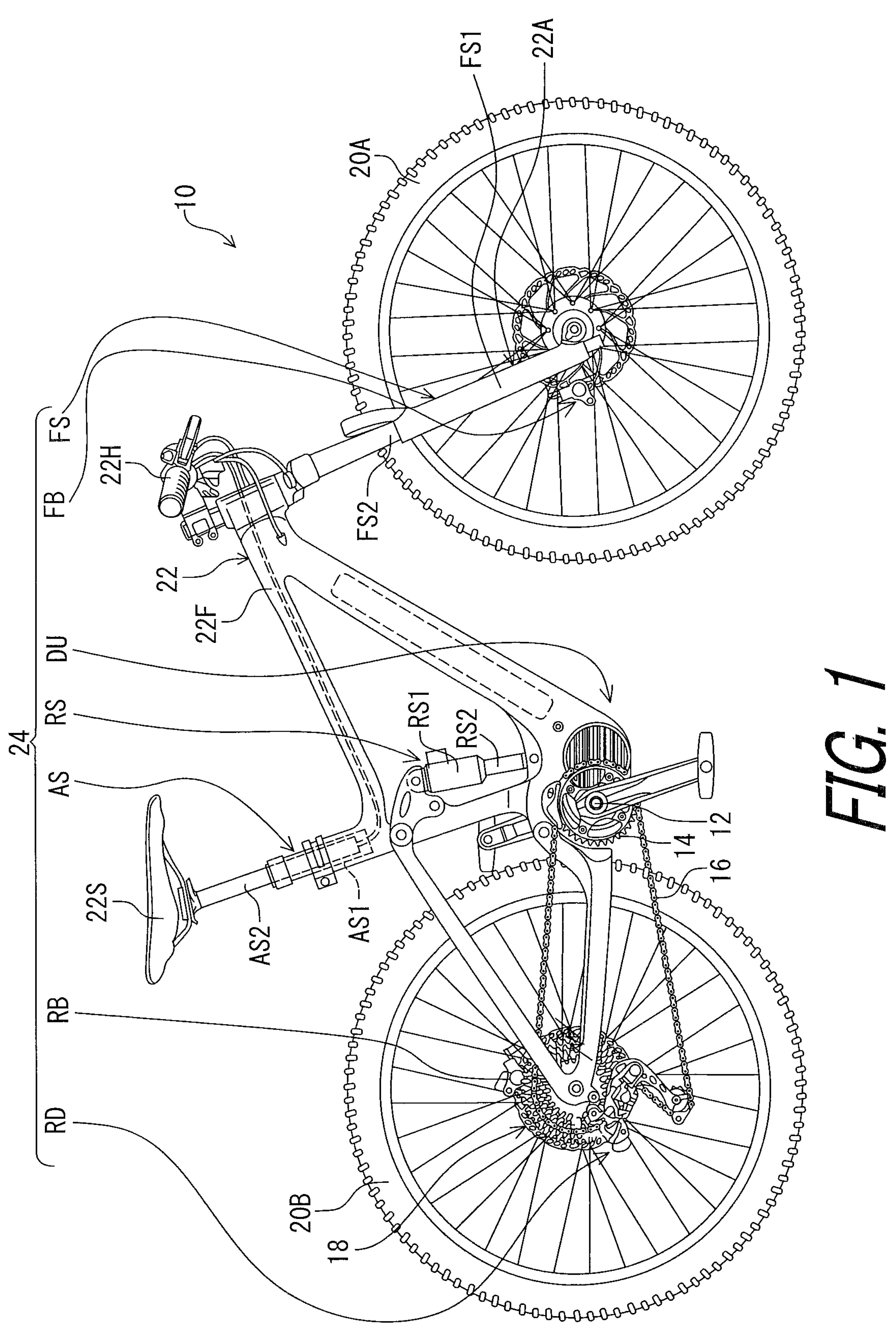
FIG. 1 is a side elevational view of a human-powered vehicle including control system in accordance with one of embodiments.

The embodiments will now be described with reference to the accompanying drawings, wherein like reference numerals designate corresponding or identical elements throughout the various drawings.

As seen in FIG. 1, a human-powered vehicle 10 includes a crank 12, a sprocket 14, a chain 16, a sprocket assembly 18, a wheel 20A, a wheel 20B, and a vehicle body 22. The vehicle body 22 includes, for example, a frame 22F, a handlebar 22H, a front fork 22A, and a saddle 22S. The crank 12 is rotatably coupled to the vehicle body 22. The crank 12 is rotatable relative to the vehicle body 22 during pedaling. The sprocket 14 is coupled to the crank 12. The sprocket assembly 18 is rotatably coupled to the vehicle body 22. The chain 16 is engaged with the sprocket 14 and the sprocket assembly 18. The sprocket assembly 18 is coupled to the wheel 20A to transmit a pedaling force from the crank 12 to the wheel 20A via the sprocket 14 and the chain 16. The sprocket 14 can include at least two sprockets if needed or desired.

As seen in FIG. 1, the human-powered vehicle 10 includes a control system 24. The control system 24 of the human-powered vehicle 10 comprises a first electric device FS. The first electric device FS is configured to be mounted to the vehicle body 22 of the human-powered vehicle 10.

The first electric device FS includes a suspension. The first electric device FS is configured to absorb shocks or vibrations generated by riding on rough terrain. The first electric device FS is installed in the front fork 22A. The first electric device FS is configured to absorb shocks or vibrations transmitted from the wheel 20A. The first electric device FS includes a first longitudinal member FS1 and a second longitudinal member FS2. The first longitudinal member FS1 and the second longitudinal member FS2 are relatively movable.

Figure 2:
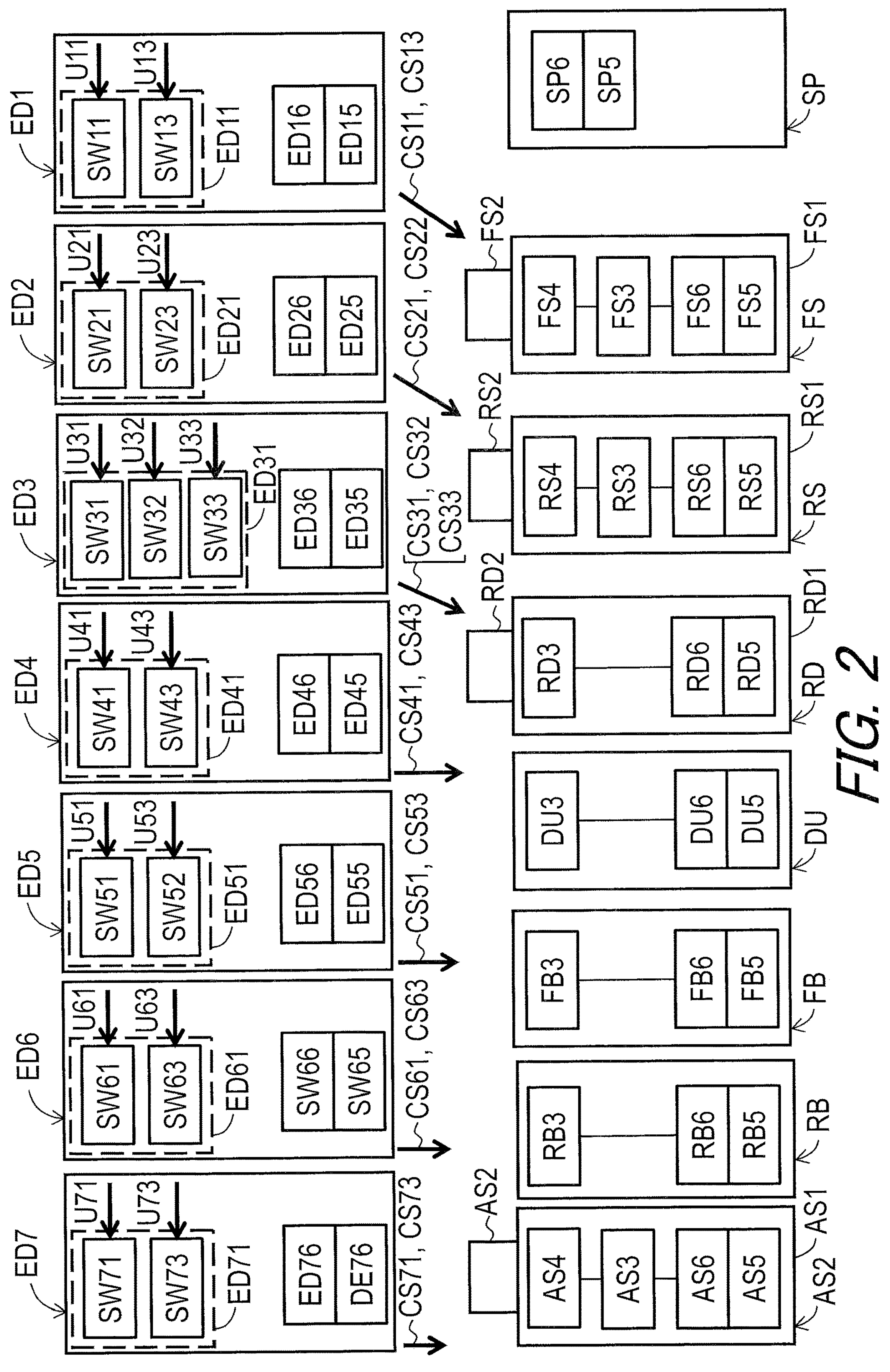
FIG. 2 is a schematic block diagram of the control system of the human-powered vehicle illustrated in FIG. 1.

As seen in FIG. 2, the first electric device FS of the human-powered vehicle 10 comprises an electric actuator FS3. The electric actuator FS3 is configured to generate an actuation force. Examples of the electric actuator FS3 include an electric motor.

The first electric device FS includes a state changing structure FS4 configured to change the state of the first electric device FS between a first state and a second state. The electric actuator FS3 is configured to actuate the state changing structure FS4 to change the state of the first electric device FS between the first state and the second state. For example, the state changing structure FS4 includes a valve unit.

For example, the state changing structure FS4 is configured to allow the first longitudinal member FS1 and the second longitudinal member FS2 to relatively move in the first state. The state changing structure FS4 is configured to restrict the first longitudinal member FS1 and the second longitudinal member FS2 from relatively moving in the second state.

The first electric device FS comprises a first electric power source FS5 and a first power source holder FS6. The first electric power source FS5 is configured to supply electricity to the electric actuator FS3. The first power source holder FS6 is configured to detachably and reattachably hold the first electric power source FS5. The first electric power source FS5 is configured to be detachably and reattachably attached to the first power source holder FS6. The first power source holder FS6 is electrically connected to the electric actuator FS3. The first electric power source FS5 is configured to supply electricity to the electric actuator FS3 via the first power source holder FS6. Examples of the first electric power source FS5 includes a primary battery and a secondary battery.

As seen in FIG. 1, the control system 24 of the human-powered vehicle 10 comprises a first electric device RS. The first electric device RS is configured to be mounted to the vehicle body 22 of the human-powered vehicle 10.

The first electric device RS includes a suspension. The first electric device RS is configured to absorb shocks or vibrations generated by riding on rough terrain. The first electric device RS is configured to absorb shocks or vibrations transmitted from the wheel 20B. The first electric device RS includes a first longitudinal member RS1 and a second longitudinal member RS2. The first longitudinal member RS1 and the second longitudinal member RS2 are relatively movable.

As seen in FIG. 2, the first electric device RS of the human-powered vehicle 10 comprises an electric actuator RS3. The electric actuator RS3 is configured to generate an actuation force. Examples of the electric actuator RS3 include an electric motor.

The first electric device RS includes a state changing structure RS4 configured to change the state of the first electric device RS between a first state and a second state. The electric actuator RS3 is configured to actuate the state changing structure RS4 to change the state of the first electric device RS between the first state and the second state. For example, the state changing structure RS4 includes a valve unit.

The state changing structure RS4 is configured to allow the first longitudinal member RS1 and the second longitudinal member RS2 to relatively move in the first state. The state changing structure RS4 is configured to restrict the first longitudinal member RS1 and the second longitudinal member RS2 from relatively moving in the second state.

The first electric device RS comprises a first electric power source RS5 and a first power source holder RS6. The first electric power source RS5 is configured to supply electricity to the electric actuator RS3. The first power source holder RS6 is configured to detachably and reattachably hold the first electric power source RS5. The first electric power source RS5 is configured to be detachably and reattachably attached to the first power source holder RS6. The first power source holder RS6 is electrically connected to the electric actuator RS3. The first electric power source RS5 is configured to supply electricity to the electric actuator RS3 via the first power source holder RS6. Examples of the first electric power source RS5 includes a primary battery and a secondary battery.

As seen in FIG. 1, the control system 24 of the human-powered vehicle 10 comprises a first electric device RD. The first electric device RD is configured to be mounted to the vehicle body 22 of the human-powered vehicle 10.

The first electric device RD includes a gear changer. The first electric device RD is configured to change a gear ratio of the human-powered vehicle 10. The gear ratio is a ratio of a rotational speed of the sprocket assembly 18 to a rotational speed of the sprocket 14. The first electric device RD is configured to shift the chain 16 relative to the sprocket assembly 18. In the present embodiment, the first electric device RD includes a rear derailleur. However, the first electric device RD can include another type of gear changer if needed or desired. Examples of another type of gear changer include a front derailleur and an internal-gear hub.

As seen in FIG. 2, the first electric device RD further comprises a base member RD1 and a movable member RD2. The base member RD1 is mountable to the vehicle body 22 of the human-powered vehicle 10. The movable member RD2 is movable relative to the base member RD1. For example, the movable member RD2 includes a chain guide and a linkage. The chain guide is contactable with the chain 16. The linkage movably couples the base member RD1 and the chain guide. The electric actuator RD3 is at least partially provided to at least one of the base member RD1 and the movable member RD2.

The first electric device RD of the human-powered vehicle 10 comprises an electric actuator RD3. The electric actuator RD3 is configured to generate an actuation force. Examples of the electric actuator RD3 include an electric motor. The electric actuator RD3 is coupled to at least one of the base member RD1 and the movable member RD2 to move the movable member RD2 relative to the base member RD1.

The first electric device RD comprises a first electric power source RD5 and a first power source holder RD6. The first electric power source RD5 is configured to supply electricity to the electric actuator RD3. The first power source holder RD6 is configured to detachably and reattachably hold the first electric power source RD5. The first electric power source RD5 is configured to be detachably and reattachably attached to the first power source holder RD6. The first power source holder RD6 is electrically connected to the electric actuator RD3. The first electric power source RD5 is configured to supply electricity to the electric actuator RD3 via the first power source holder RD6. Examples of the first electric power source RD5 includes a primary battery and a secondary battery.

As seen in FIG. 1, the control system 24 of the human-powered vehicle 10 comprises a first electric device DU. The first electric device DU is configured to be mounted to the vehicle body 22 of the human-powered vehicle 10.

The first electric device DU includes an assist driving unit. The first electric device DU is configured to assist propulsion of the human-powered vehicle 10. The first electric device DU is configured to change an assist ratio depending on a human power applied to the human-powered vehicle 10.

As seen in FIG. 2, the first electric device DU of the human-powered vehicle 10 comprises an electric actuator DU3. The electric actuator DU3 is configured to generate an actuation force. Examples of the electric actuator DU3 include an electric motor. The electric actuator DU3 is configured to apply the actuation force to the human-powered vehicle 10 to assist propulsion of the human-powered vehicle 10.

The first electric device DU comprises a first electric power source DU5 and a first power source holder DU6. The first electric power source DU5 is configured to supply electricity to the electric actuator DU3. The first power source holder DU6 is configured to detachably and reattachably hold the first electric power source DU5. The first electric power source DU5 is configured to be detachably and reattachably attached to the first power source holder DU6. The first power source holder DU6 is electrically connected to the electric actuator DU3. The first electric power source DU5 is configured to supply electricity to the electric actuator DU3 via the first power source holder DU6. Examples of the first electric power source DU5 includes a primary battery and a secondary battery.

As seen in FIG. 1, the control system 24 of the human-powered vehicle 10 comprises a first electric device FB. The first electric device FB is configured to be mounted to the vehicle body 22 of the human-powered vehicle 10.

The first electric device FB includes a braking device. The first electric device FB is configured to apply a braking force to the human-powered vehicle 10. The first electric device FB is configured to apply a braking force to the wheel 20A.

As seen in FIG. 2, the first electric device FB of the human-powered vehicle 10 comprises an electric actuator FB3. The electric actuator FB3 is configured to generate an actuation force. Examples of the electric actuator FB3 include an electric motor. The electric actuator FB3 is configured to apply the actuation force to the human-powered vehicle 10 as the braking force.

The first electric device FB comprises a first electric power source FB5 and a first power source holder FB6. The first electric power source FB5 is configured to supply electricity to the electric actuator FB3. The first power source holder FB6 is configured to detachably and reattachably hold the first electric power source FB5. The first electric power source FB5 is configured to be detachably and reattachably attached to the first power source holder FB6. The first power source holder FB6 is electrically connected to the electric actuator FB3. The first electric power source FB5 is configured to supply electricity to the electric actuator FB3 via the first power source holder FB6. Examples of the first electric power source FB5 includes a primary battery and a secondary battery.

As seen in FIG. 1, the control system 24 of the human-powered vehicle 10 comprises a first electric device RB. The first electric device RB is configured to be mounted to the vehicle body 22 of the human-powered vehicle 10.

The first electric device RB includes a braking device. The first electric device RB is configured to apply a braking force to the human-powered vehicle 10. The first electric device RB is configured to apply a braking force to the wheel 20B.

As seen in FIG. 2, the first electric device RB of the human-powered vehicle 10 comprises an electric actuator RB3. The electric actuator RB3 is configured to generate an actuation force. Examples of the electric actuator RB3 include an electric motor. The electric actuator RB3 is configured to apply the actuation force to the human-powered vehicle 10 as the braking force.

The first electric device RB comprises a first electric power source RB5 and a first power source holder RB6. The first electric power source RB5 is configured to supply electricity to the electric actuator RB3. The first power source holder RB6 is configured to detachably and reattachably hold the first electric power source RB5. The first electric power source RB5 is configured to be detachably and reattachably attached to the first power source holder RB6. The first power source holder RB6 is electrically connected to the electric actuator RB3. The first electric power source RB5 is configured to supply electricity to the electric actuator RB3 via the first power source holder RB6. Examples of the first electric power source RB5 includes a primary battery and a secondary battery.

As seen in FIG. 1, the control system 24 of the human-powered vehicle 10 comprises a first electric device AS. The first electric device AS is configured to be mounted to the vehicle body 22 of the human-powered vehicle 10.

The first electric device AS includes an adjustable seat-post. The first electric device AS is configured to change a height of the saddle 22S relative to the frame 22F. The electric device 32 has an adjustable state and a locked state. The electric device 32 allows the user to change the height of the saddle 22S in the adjustable state. The electric device 32 is locked to maintain the height of the saddle 22S in the locked state. The electric device 32 is configured to change the state of the electric device 32 between the adjustable state and the locked state. The first electric device AS includes a first longitudinal member AS1 and a second longitudinal member AS2. The first longitudinal member AS1 and the second longitudinal member AS2 are relatively movable.

As seen in FIG. 2, the first electric device AS of the human-powered vehicle 10 comprises an electric actuator AS3. The electric actuator AS3 is configured to generate an actuation force. Examples of the electric actuator AS3 include an electric motor. The actuation force changes the state of the first electric device AS between the first state and the second state.

The first electric device AS includes a state changing structure AS4 configured to change the state of the first electric device AS between the adjustable state and the locked state. The electric actuator AS3 is configured to actuate the state changing structure AS4 to change the state of the first electric device AS between the adjustable state and the locked state. For example, the state changing structure AS4 includes a valve unit.

The state changing structure AS4 is configured to allow the first longitudinal member AS1 and the second longitudinal member AS2 to relatively move in the adjustable state. The state changing structure AS4 is configured to restrict the first longitudinal member AS1 and the second longitudinal member AS2 from relatively moving in the locked state.

The first electric device AS comprises a first electric power source AS5 and a first power source holder AS6. The first electric power source AS5 is configured to supply electricity to the electric actuator AS3. The first power source holder AS6 is configured to detachably and reattachably hold the first electric power source AS5. The first electric power source AS5 is configured to be detachably and reattachably attached to the first power source holder AS6. The first power source holder AS6 is electrically connected to the electric actuator AS3. The first electric power source AS5 is configured to supply electricity to the electric actuator AS3 via the first power source holder AS6. Examples of the first electric power source AS5 includes a primary battery and a secondary battery.

The human-powered vehicle 10 can include another electric device other than the first electric devices FS, RS, RD, DU, FB, RB, and AS if needed or desired. At least one of the first electric devices FS, RS, RD, DU, FB, RB, and AS can be omitted from the human-powered vehicle 10 if needed or desired.

As seen in FIG. 2, the control system 24 comprises a third electric device SP. The third electric device SP is configured to be mounted to the vehicle body 22 of the human-powered vehicle 10. For example, the third electric device SP includes at least one of a smartphone and a cycle computer. The third electric device SP is configured to display information relating to the human-powered vehicle 10. However, the third electric device SP can include structures other than the smartphone and the cycle computer if needed or desired.

The third electric device SP comprises a third electric power source SP5 and a third power source holder SP6. The third power source holder SP6 is configured to detachably and reattachably hold the third electric power source SP5. The third electric power source SP5 is configured to be detachably and reattachably attached to the third power source holder SP6. Examples of the third electric power source SP5 includes a primary battery and a secondary battery.

As seen in FIG. 2, the control system 24 of the human-powered vehicle 10 comprises a second electric device ED1. The second electric device ED1 is configured to be mounted to the vehicle body 22 of the human-powered vehicle 10. The second electric device ED1 is configured to operate the first electric device FS. The second electric device ED1 can be mounted to parts other than the handlebar 22H if needed or desired. The second electric device ED1 can also be referred to as an operating device ED1.

The second electric device ED1 of the human-powered vehicle 10 comprises a user interface ED11. The user interface ED11 is configured to receive a user input U11. For example, the user interface ED11 includes an electric switch SW11 configured to be activated by the user input U11. The user input U11 includes pressing of the electric switch SW11. The user interface ED11 can include structures other than the electric switch SW11 if needed or desired.

The user interface ED11 is configured to receive an additional user input U13 different from the user input U11. The user interface ED11 includes an additional electric switch SW13 configured to be activated by the additional user input U13. The additional user input U13 includes pressing of the additional electric switch SW13. The additional user interface ED13 can include structures other than the additional electric switch SW13 if needed or desired. The additional user input U13 can include concurrently pressing of the electric switch SW11 and the additional electric switch SW13.

The second electric device ED1 is configured to operate the first electric device FS in response to the user input U11. The second electric device ED1 is configured to generate a control signal CS11 in response to the user input U11. The first electric device FS has a first state and a second state. For example, the first electric device FS is configured to absorb shocks or vibrations generated by riding on rough terrain in the first state. The first electric device FS is configured to be free of absorbing shocks or vibrations generated by riding on rough terrain in the second state. The first electric device FS can be configured to have a first stroke in the first state while the first electric device FS can be configured to have a second stroke different from the first stroke in the second state. The first electric device FS can be configured to have a first damper performance in the first state while the first electric device FS can be configured to have a second damper performance different from the first damper performance in the second state. The first electric device FS is configured to change the state of the first electric device FS between the first state and the second state in response to the control signal CS11. The control signal CS11 indicates changing of the state of the first electric device FS.

The second electric device ED1 is configured to operate the third electric device SP in response to the additional user input U13. The second electric device ED1 is configured to generate an additional control signal CS13 in response to the additional user input U13. The third electric device SP is configured to change a state of the third electric device SP between at least two states in response to the additional control signal CS13. For example, the third electric device SP has at least two displaying states. The at least two displaying states includes different contents. The third electric device SP is configured to change a state of the third electric device SP between the at least two displaying states in response to the additional control signal CS13. The additional control signal CS13 indicates changing of the state of the third electric device SP.

The second electric device ED1 comprises a second electric power source ED15 and a second power source holder ED16. The second power source holder ED16 is configured to detachably and reattachably hold the second electric power source ED15. The second electric power source ED15 is configured to be detachably and reattachably attached to the second power source holder ED16. Examples of the second electric power source ED15 includes a primary battery and a secondary battery.

As seen in FIG. 2, the control system 24 of the human-powered vehicle 10 comprises a second electric device ED2. The second electric device ED2 is configured to be mounted to the vehicle body 22 of the human-powered vehicle 10. The second electric device ED2 is configured to operate the first electric device RS. The second electric device ED2 can be mounted to parts other than the handlebar 22H if needed or desired. The second electric device ED2 can also be referred to as an operating device ED2.

The second electric device ED2 of the human-powered vehicle 10 comprises a user interface ED21. The user interface ED21 is configured to receive a user input U21. For example, the user interface ED21 includes an electric switch SW21 configured to be activated by the user input U21. The user input U21 includes pressing of the electric switch SW21. The user interface ED21 can include structures other than the electric switch SW21 if needed or desired.

The user interface ED21 is configured to receive an additional user input U23 different from the user input U21. The user interface ED21 includes an additional electric switch SW23 configured to be activated by the additional user input U23. The additional user input U23 includes pressing of the additional electric switch SW23. The additional user interface ED23 can include structures other than the additional electric switch SW23 if needed or desired. The additional user input U23 can include concurrently pressing of the electric switch SW21 and the additional electric switch SW23.

The second electric device ED2 is configured to operate the first electric device RS in response to the user input U21. The second electric device ED2 is configured to generate a control signal CS21 in response to the user input U21. The first electric device RS has a first state and a second state. For example, the first electric device RS is configured to absorb shocks or vibrations generated by riding on rough terrain in the first state. The first electric device RS is configured to be free of absorbing shocks or vibrations generated by riding on rough terrain in the second state. The first electric device RS can be configured to have a first stroke in the first state while the first electric device RS can be configured to have a second stroke different from the first stroke in the second state. The first electric device RS can be configured to have a first damper performance in the first state while the first electric device RS can be configured to have a second damper performance different from the first damper performance in the second state. The first electric device RS is configured to change the state of the first electric device RS between the first state and the second state in response to the control signal CS21. The control signal CS21 indicates changing of the state of the first electric device RS.

The second electric device ED2 is configured to operate the third electric device SP in response to the additional user input U23. The second electric device ED2 is configured to generate an additional control signal CS23 in response to the additional user input U23. The third electric device SP is configured to change a state of the third electric device SP between at least two states in response to the additional control signal CS23. For example, the third electric device SP has at least two displaying states. The at least two displaying states includes different contents. The third electric device SP is configured to change a state of the third electric device SP between the at least two displaying states in response to the additional control signal CS23. The additional control signal CS23 indicates changing of the state of the third electric device SP.

The second electric device ED2 comprises a second electric power source ED25 and a second power source holder ED26. The second power source holder ED26 is configured to detachably and reattachably hold the second electric power source ED25. The second electric power source ED25 is configured to be detachably and reattachably attached to the second power source holder ED26. Examples of the second electric power source ED25 includes a primary battery and a secondary battery.

As seen in FIG. 2, the control system 24 of the human-powered vehicle 10 comprises a second electric device ED3. The second electric device ED3 is configured to be mounted to the vehicle body 22 of the human-powered vehicle 10. The second electric device ED3 is configured to operate the first electric device RD. The second electric device ED3 can be mounted to parts other than the handlebar 22H if needed or desired. The second electric device ED3 can also be referred to as an operating device ED3.

The second electric device ED3 of the human-powered vehicle 10 comprises a user interface ED31. The user interface ED31 is configured to receive a user input U31 or U32. For example, the user interface ED31 includes an electric switch SW31 configured to be activated by the user input U31. The user interface ED31 includes an electric switch SW32 configured to be activated by the user input U32. The user input U31 includes pressing of the electric switch SW31. The user input U32 includes pressing of the electric switch SW32. The user interface ED31 can include structures other than the electric switch SW31 or SW32 if needed or desired.

The user interface ED31 is configured to receive an additional user input U33 different from the user input U31 or U32. The user interface ED31 includes an additional electric switch SW33 configured to be activated by the additional user input U33. The additional user input U33 includes pressing of the additional electric switch SW33. The additional user interface ED33 can include structures other than the additional electric switch SW33 if needed or desired. The additional user input U33 can include concurrently pressing of the electric switch SW31 and the additional electric switch SW33.

The second electric device ED3 is configured to operate the first electric device RS in response to the user input U31 or U32. The second electric device ED3 is configured to generate a control signal CS31 in response to the user input U31. The second electric device ED3 is configured to generate a control signal CS32 in response to the user input U32. The second electric device ED3 can include a single operating device or at least two separate operating devices.

The first electric device RD is configured to change the gear ratio in response to the control signal CS31 or CS32 generated by the second electric device ED3. For example, the control signal CS31 indicates one of upshifting and downshifting of the first electric device RD. The control signal CS32 indicates the other of upshifting and downshifting of the first electric device RD.

The second electric device ED3 is configured to operate the third electric device SP in response to the additional user input U33. The second electric device ED3 is configured to generate an additional control signal CS33 in response to the additional user input U33. The third electric device SP is configured to change a state of the third electric device SP between at least two states in response to the additional control signal CS33. For example, the third electric device SP has at least two displaying states. The at least two displaying states includes different contents. The third electric device SP is configured to change a state of the third electric device SP between the at least two displaying states in response to the additional control signal CS33. The additional control signal CS33 indicates changing of the state of the third electric device SP.

The second electric device ED3 comprises a second electric power source ED35 and a second power source holder ED36. The second power source holder ED36 is configured to detachably and reattachably hold the second electric power source ED35. The second electric power source ED35 is configured to be detachably and reattachably attached to the second power source holder ED36. Examples of the second electric power source ED35 includes a primary battery and a secondary battery.

As seen in FIG. 2, the control system 24 of the human-powered vehicle 10 comprises a second electric device ED4. The second electric device ED4 is configured to be mounted to the vehicle body 22 of the human-powered vehicle 10. The second electric device ED4 is configured to operate the first electric device FS. The second electric device ED4 can be mounted to parts other than the handlebar 22H if needed or desired. The second electric device ED4 can also be referred to as an operating device ED4.

The second electric device ED4 of the human-powered vehicle 10 comprises a user interface ED41. The user interface ED41 is configured to receive a user input U41. For example, the user interface ED41 includes an electric switch SW41 configured to be activated by the user input U41. The user input U41 includes pressing of the electric switch SW41. The user interface ED41 can include structures other than the electric switch SW41 if needed or desired.

The user interface ED41 is configured to receive an additional user input U43 different from the user input U41. The user interface ED41 includes an additional electric switch SW43 configured to be activated by the additional user input U43. The additional user input U43 includes pressing of the additional electric switch SW43. The additional user interface ED43 can include structures other than the additional electric switch SW43 if needed or desired. The additional user input U43 can include concurrently pressing of the electric switch SW41 and the additional electric switch SW43.

The second electric device ED4 is configured to operate the first electric device DU in response to the user input U41. The second electric device ED4 is configured to generate a control signal CS41 in response to the user input U41. The first electric device DU is configured to change the assist ratio which is a ratio of the assist driving force to the human power applied to the human-powered vehicle 10 in response to the control signal CS41 generated by the second electric device ED4. The first electric device DU includes at least two assist ratios. The first electric device DU is configured to change the assist ratio between the at least two assist ratios in response to the control signal CS41.

The second electric device ED4 is configured to operate the third electric device SP in response to the additional user input U43. The second electric device ED4 is configured to generate an additional control signal CS43 in response to the additional user input U43. The third electric device SP is configured to change a state of the third electric device SP between at least two states in response to the additional control signal CS43. For example, the third electric device SP has at least two displaying states. The at least two displaying states includes different contents. The third electric device SP is configured to change a state of the third electric device SP between the at least two displaying states in response to the additional control signal CS43. The additional control signal CS43 indicates changing of the state of the third electric device SP.

The second electric device ED4 comprises a second electric power source ED45 and a second power source holder ED46. The second power source holder ED46 is configured to detachably and reattachably hold the second electric power source ED45. The second electric power source ED45 is configured to be detachably and reattachably attached to the second power source holder ED46. Examples of the second electric power source ED45 includes a primary battery and a secondary battery.

As seen in FIG. 2, the control system 24 of the human-powered vehicle 10 comprises a second electric device ED5. The second electric device ED5 is configured to be mounted to the vehicle body 22 of the human-powered vehicle 10. The second electric device ED5 is configured to operate the first electric device FS. The second electric device ED5 can be mounted to parts other than the handlebar 22H if needed or desired. The second electric device ED5 can also be referred to as an operating device ED5.

The second electric device ED5 of the human-powered vehicle 10 comprises a user interface ED51. The user interface ED51 is configured to receive a user input U51. For example, the user interface ED51 includes an electric switch SW51 configured to be activated by the user input U51. The user input U51 includes pressing of the electric switch SW51. The user interface ED51 can include structures other than the electric switch SW51 if needed or desired.

The user interface ED51 is configured to receive an additional user input U53 different from the user input U51. The user interface ED51 includes an additional electric switch SW53 configured to be activated by the additional user input U53. The additional user input U53 includes pressing of the additional electric switch SW53. The additional user interface ED53 can include structures other than the additional electric switch SW53 if needed or desired. The additional user input U53 can include concurrently pressing of the electric switch SW51 and the additional electric switch SW53.

The second electric device ED5 is configured to operate the first electric device FB in response to the user input U51. The second electric device ED5 is configured to generate a control signal CS51 in response to the user input U51. The first electric device FB is configured to apply the braking force to the human-powered vehicle 10 in response to the control signal CS51 generated by the second electric device ED5.

The second electric device ED5 is configured to operate the third electric device SP in response to the additional user input U53. The second electric device ED5 is configured to generate an additional control signal CS53 in response to the additional user input U53. The third electric device SP is configured to change a state of the third electric device SP between at least two states in response to the additional control signal CS53. For example, the third electric device SP has at least two displaying states. The at least two displaying states includes different contents. The third electric device SP is configured to change a state of the third electric device SP between the at least two displaying states in response to the additional control signal CS53. The additional control signal CS53 indicates changing of the state of the third electric device SP.

The second electric device ED5 comprises a second electric power source ED55 and a second power source holder ED56. The second power source holder ED56 is configured to detachably and reattachably hold the second electric power source ED55. The second electric power source ED55 is configured to be detachably and reattachably attached to the second power source holder ED56. Examples of the second electric power source ED55 includes a primary battery and a secondary battery.

As seen in FIG. 2, the control system 24 of the human-powered vehicle 10 comprises a second electric device ED6. The second electric device ED6 is configured to be mounted to the vehicle body 22 of the human-powered vehicle 10. The second electric device ED6 is configured to operate the first electric device RB. The second electric device ED6 can be mounted to parts other than the handlebar 22H if needed or desired. The second electric device ED6 can also be referred to as an operating device ED6.

The second electric device ED6 of the human-powered vehicle 10 comprises a user interface ED61. The user interface ED61 is configured to receive a user input U61. For example, the user interface ED61 includes an electric switch SW61 configured to be activated by the user input U61. The user input U61 includes pressing of the electric switch SW61. The user interface ED61 can include structures other than the electric switch SW61 if needed or desired.

The user interface ED61 is configured to receive an additional user input U63 different from the user input U61. The user interface ED61 includes an additional electric switch SW63 configured to be activated by the additional user input U63. The additional user input U63 includes pressing of the additional electric switch SW63. The additional user interface ED63 can include structures other than the additional electric switch SW63 if needed or desired. The additional user input U63 can include concurrently pressing of the electric switch SW61 and the additional electric switch SW63.

The second electric device ED6 is configured to operate the first electric device RB in response to the user input U61. The second electric device ED6 is configured to generate a control signal CS61 in response to the user input U61. The first electric device RB is configured to apply the braking force to the human-powered vehicle 10 in response to the control signal CS61 generated by the second electric device ED6.

The second electric device ED6 is configured to operate the third electric device SP in response to the additional user input U63. The second electric device ED6 is configured to generate an additional control signal CS63 in response to the additional user input U63. The third electric device SP is configured to change a state of the third electric device SP between at least two states in response to the additional control signal CS63. For example, the third electric device SP has at least two displaying states. The at least two displaying states includes different contents. The third electric device SP is configured to change a state of the third electric device SP between the at least two displaying states in response to the additional control signal CS63. The additional control signal CS63 indicates changing of the state of the third electric device SP.

The second electric device ED6 comprises a second electric power source ED65 and a second power source holder ED66. The second power source holder ED66 is configured to detachably and reattachably hold the second electric power source ED65. The second electric power source ED65 is configured to be detachably and reattachably attached to the second power source holder ED66. Examples of the second electric power source ED65 includes a primary battery and a secondary battery.

As seen in FIG. 2, the control system 24 of the human-powered vehicle 10 comprises a second electric device ED7. The second electric device ED7 is configured to be mounted to the vehicle body 22 of the human-powered vehicle 10. The second electric device ED7 is configured to operate the first electric device AS. The second electric device ED7 can be mounted to parts other than the handlebar 22H if needed or desired. The second electric device ED7 can also be referred to as an operating device ED7.

The second electric device ED7 of the human-powered vehicle 10 comprises a user interface ED71. The user interface ED71 is configured to receive a user input U71. For example, the user interface ED71 includes an electric switch SW71 configured to be activated by the user input U71. The user input U71 includes pressing of the electric switch SW71. The user interface ED71 can include structures other than the electric switch SW71 if needed or desired.

The user interface ED71 is configured to receive an additional user input U73 different from the user input U71. The user interface ED71 includes an additional electric switch SW73 configured to be activated by the additional user input U73. The additional user input U73 includes pressing of the additional electric switch SW73. The additional user interface ED73 can include structures other than the additional electric switch SW73 if needed or desired. The additional user input U73 can include concurrently pressing of the electric switch SW71 and the additional electric switch SW73.

The second electric device ED7 is configured to operate the first electric device AS in response to the user input U7. The second electric device ED7 is configured to generate a control signal CS7 in response to the user input U7. The first electric device AS is configured to the state of the first electric device AS between the adjustable state and the locked state in response to the control signal CS7 generated by the second electric device ED7.

The second electric device ED7 is configured to operate the third electric device SP in response to the additional user input U73. The second electric device ED7 is configured to generate an additional control signal CS73 in response to the additional user input U73. The third electric device SP is configured to change a state of the third electric device SP between at least two states in response to the additional control signal CS73. For example, the third electric device SP has at least two displaying states. The at least two displaying states includes different contents. The third electric device SP is configured to change a state of the third electric device SP between the at least two displaying states in response to the additional control signal CS73. The additional control signal CS73 indicates changing of the state of the third electric device SP.

The second electric device ED7 comprises a second electric power source ED75 and a second power source holder ED76. The second power source holder ED76 is configured to detachably and reattachably hold the second electric power source ED75. The second electric power source ED75 is configured to be detachably and reattachably attached to the second power source holder ED76. Examples of the second electric power source ED75 includes a primary battery and a secondary battery.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 10 with facing a handlebar or steering. Examples of the user's standard position include a saddle and a seat. Accordingly, these terms, as utilized to describe the first electric devices FS, RS, RD, DU, FB, RB, and AS, the second electric devices ED1, ED2, ED3, ED4, ED5, ED6, and ED7, or other devices, should be interpreted relative to the human-powered vehicle 10 equipped with the first electric devices FS, RS, RD, DU, FB, RB, and AS, the second electric devices ED1, ED2, ED3, ED4, ED5, ED6, and ED7, or other devices as used in an upright riding position on a horizontal surface.

In the present embodiment, the first electric device FS and the second electric device ED1 will be described in detail hereinafter. The structure of the first electric device FS can be applied to each of the first electric devices RS, RD, DU, FB, RB, and AS or other electric devices if needed or desired. The structure of the second electric device ED1 can be applied to each of the second electric devices ED2, ED3, ED4, ED5, ED6, and ED7.

Figure 3:
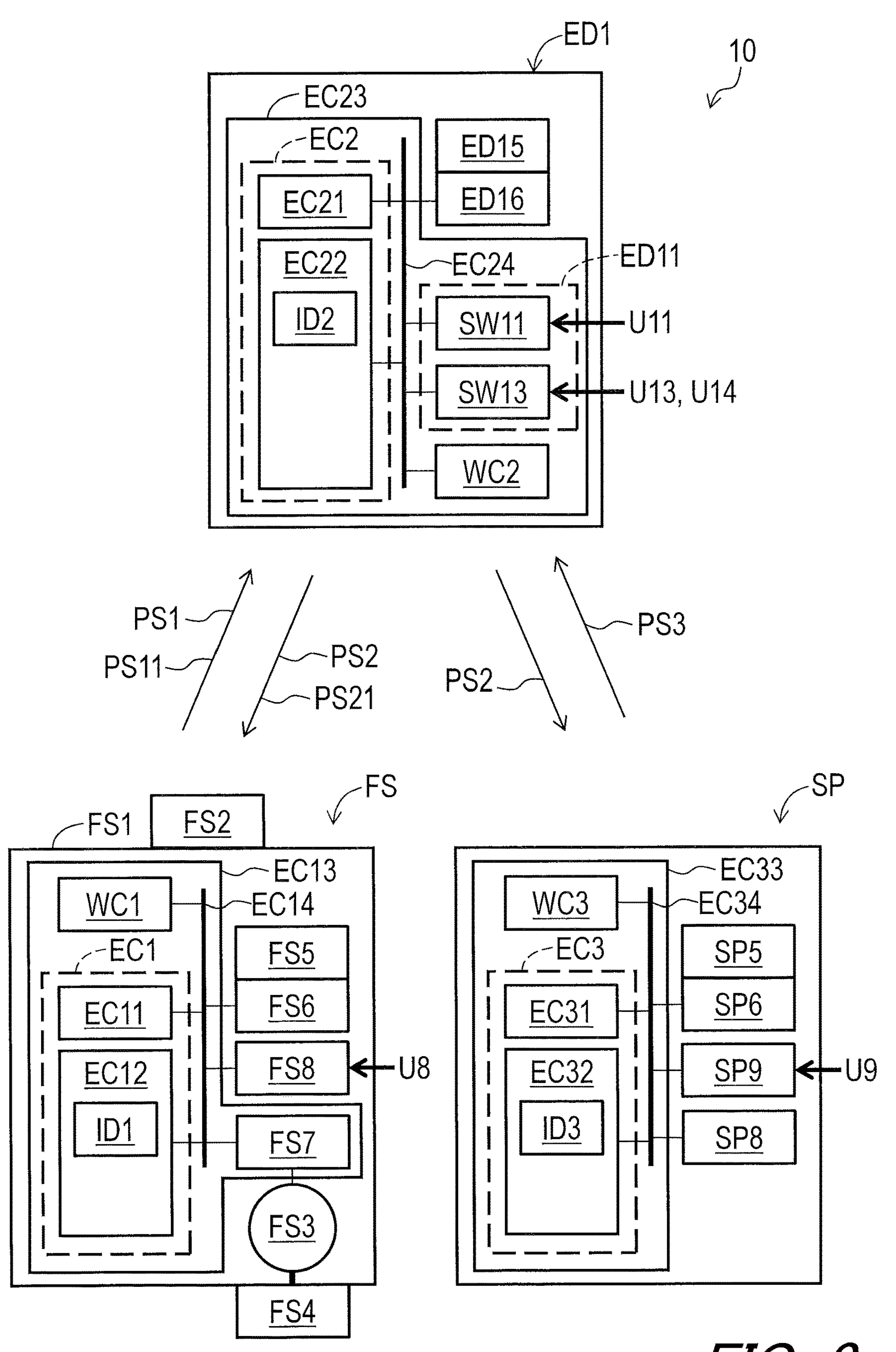
FIGS. 3 to 9 are schematic block diagrams of a first electric device, a second electric device, and a third electric device of the control system illustrated in FIG. 2.

As seen in FIG. 3, the first electric device FS and the second electric device ED1 are configured to wirelessly communicate. The first electric device FS of the human-powered vehicle 10 comprises a first wireless communicator WC1. The second electric device ED1 of the human-powered vehicle 10 comprises a second wireless communicator WC2. The first wireless communicator WC1 is configured to wirelessly communicate with the second wireless communicator WC2 of the second electric device ED1. The second wireless communicator WC2 is configured to wirelessly communicate with the first wireless communicator WC1 of the first electric device FS.

In the present embodiment, the first electric device FS and the second electric device ED1 are configured to wirelessly communicate. The third electric device SP comprises a third wireless communicator WC3. The second wireless communicator WC2 is configured to wirelessly communicate with the third wireless communicator WC3 of the third electric device SP.

The first electric device FS of the human-powered vehicle 10 comprises a first electronic controller EC1. The first electronic controller EC1 is electrically connected to the electric actuator FS3 to control the electric actuator FS3 based on the user input U11 received by the second electric device ED1. The first electronic controller EC1 is configured to control the electric actuator FS3 to generate the actuation force based on the user input U11 received by the second electric device ED1. The first electronic controller EC1 is electrically connected to the first wireless communicator WC1 to control the first wireless communicator WC1. The first electronic controller EC1 is configured to control the first wireless communicator WC1 to wirelessly communicate with the second wireless communicator WC2.

The first power source holder FS6 is electrically connected to the first electronic controller EC1, the first wireless communicator WC1, and the electric actuator FS3. The first electric power source FS5 is configured to supply electricity to the first electronic controller EC1, the first wireless communicator WC1, and the electric actuator FS3 via the first power source holder FS6.

As seen in FIG. 3, the first electronic controller EC1 includes a first processor EC11. The first electronic controller EC1 includes a first memory EC12. The first processor EC11 is coupled to the first memory EC12. The first memory EC12 is coupled to the first processor EC11. The first electric device FS includes a circuit board EC13 and a system bus EC14. The first processor EC11 and the first memory EC12 are electrically mounted on the circuit board EC13. The first processor EC11 is electrically connected to the first memory EC12 via the circuit board EC13 and the system bus EC14. The first memory EC12 is electrically connected to the first processor EC11 via the circuit board EC13 and the system bus EC14. For example, the first electronic controller EC1 includes a semiconductor. The first processor EC11 includes a semiconductor. The first memory EC12 includes a semiconductor. However, the first electronic controller EC1 can be free of a semiconductor if needed or desired. The first processor EC11 can be free of a semiconductor if needed or desired. The first memory EC12 can be free of a semiconductor if needed or desired.

For example, the first processor EC11 includes at least one of a central processing unit (CPU), a micro processing unit (MPU), and a memory controller. The first memory EC12 is electrically connected to the first processor EC11. For example, the first memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The first memory EC12 includes storage areas each having an address. The first processor EC11 is configured to control the first memory EC12 to store data in the storage areas of the first memory EC12 and reads data from the storage areas of the first memory EC12. The first memory EC12 can also be referred to as a first hardware memory EC12. The first memory EC12 can also be referred to as a computer-readable storage medium EC12.

The first electronic controller EC1 is configured to execute at least one control algorithm of the first electric device FS. For example, the first electronic controller EC1 is programed to execute at least one control algorithm of the first electric device FS. The first memory EC12 stores at least one program including at least one program instruction. The at least one program is read into the first processor EC11, and thereby the at least one control algorithm of the first electric device FS is executed based on the at least one program. The first electronic controller EC1 can also be referred to as a first electronic controller EC1 circuit or circuitry EC1. The first electronic controller EC1 can also be referred to as a first electronic hardware controller circuit or circuitry EC1.

The structure of the first electronic controller EC1 is not limited to the above structure. The structure of the first electronic controller EC1 is not limited to the above structure. The structure of the first electronic controller EC1 is not limited to the first processor EC11 and the first memory EC12. The first electronic controller EC1 can be realized by hardware alone or a combination of hardware and software. In the present embodiment, the first processor EC11 and the first memory EC12 are integrated as a single chip such as an application specific integrated circuit (ASIC) or a field programmable gate array (FPGA). However, the first processor EC11 and the first memory EC12 can be separate chips if needed or desired. The first electronic controller EC1 can include the first processor EC11, the first memory EC12, the circuit board EC13, and the system bus EC14 if needed or desired. The first electronic controller EC1 can be at least two electronic controllers which are separately provided.

The first electronic controller EC1 can include at least two electronic controllers which are separately provided. The at least one control algorithm of the first electric device FS can be executed by the at least two electronic controllers if needed or desired. The first electronic controller EC1 can include at least two hardware processors which are separately provided. The first electronic controller EC1 can include at least two hardware memories which are separately provided. The at least one control algorithm of the first electric device FS can be executed by the at least two hardware processors if needed or desired. The at least one control algorithm of the first electric device FS can be stored in the at least two hardware memories if needed or desired. The first electronic controller EC1 can include at least two circuit boards which are separately provided if needed or desired. The first electronic controller EC1 can include at least two system buses which are separately provided if needed or desired.

As seen in FIG. 3, the first wireless communicator WC1 is electrically mounted on the circuit board EC13. The first wireless communicator WC1 is electrically mounted on the circuit board EC13. However, the first wireless communicator WC1 can be electrically mounted on another circuit board in a case where the first electronic controller EC1 includes at least two circuit boards. the first wireless communicator WC1 can be electrically mounted on another circuit board in a case where the first electronic controller EC1 includes at least two circuit boards. The first wireless communicator WC1 can be electrically mounted on an electric component other than a circuit board.

The first wireless communicator WC1 is electrically connected to the first processor EC11 and the first memory EC12 with the circuit board EC13 and the system bus EC14. The first wireless communicator WC1 includes a signal transmitting circuit or circuitry, a signal receiving circuit or circuitry, and an antenna. Thus, the first wireless communicator WC1 can also be referred to as a first wireless communicator circuit or circuitry WC1.

The first wireless communicator WC1 is configured to superimpose digital signals on carrier wave using a predetermined wireless communication protocol to wirelessly transmit signals. In the present embodiment, the first wireless communicator WC1 is configured to encrypt signals using a cryptographic key to generate encrypted wireless signals. The first wireless communicator WC1 is configured to transmit wireless signals via the antenna.

The first wireless communicator WC1 is configured to receive wireless signals via the antenna. In the present embodiment, the first wireless communicator WC1 is configured to decode the wireless signals to recognize signals transmitted from other wireless communicators. The first wireless communicator WC1 is configured to decrypt the wireless signals using the cryptographic key.

The first electric device FS includes an actuator driver FS7. The actuator driver FS7 is electrically connected to the electric actuator FS3 to control the electric actuator FS3 based on a command generated by the first electronic controller EC1. The actuator driver FS7 is electrically connected to the first electronic controller EC1 to receive the command from the first electronic controller EC1. The actuator driver FS7 is configured to supply electricity from the first electric power source FS5 to the electric actuator FS3 based on the command. The actuator driver FS7 is configured to control the actuation direction of the electric actuator FS3 based on the command.

At least one of the first processor EC11, the first memory EC12, the first wireless communicator WC1, and the actuator driver FS7 can be integrally provided with another of the first processor EC11, the first memory EC12, the first wireless communicator WC1, and the actuator driver FS7 as a single chip if needed or desired. At least one of the first processor EC11, the first memory EC12, the first wireless communicator WC1, and the actuator driver FS7 can be a separate chip from another of the first processor EC11, the first memory EC12, the first wireless communicator WC1, and the actuator driver FS7 if needed or desired.

The first electric device FS includes a user interface FS8. The user interface FS8 is configured to receive a user input U8. The user input U8 includes a start of a pairing mode of the first electric device FS, a power-on, or a power-off. However, the user input U8 can include information other than the start of the pairing, the power-on, or the power-off. The first electric device FS can be configured to start the pairing mode without the user input U8 if needed or desired.

As seen in FIG. 3, the second electric device ED1 of the human-powered vehicle 10 comprises a second electronic controller EC2. The second electronic controller EC2 is configured to control the second wireless communicator WC2 to wirelessly communicate with the first wireless communicator WC1 or the third wireless communicator WC3.

The second electronic controller EC2 includes a second processor EC21. The second electronic controller EC2 includes a second memory EC22. The second processor EC21 is coupled to the second memory EC22. The second memory EC22 is coupled to the second processor EC21. The second electric device ED1 includes a circuit board EC23 and a system bus EC24. The second processor EC21 and the second memory EC22 are electrically mounted on the circuit board EC23. The second processor EC21 is electrically connected to the second memory EC22 via the circuit board EC23 and the system bus EC24. The second memory EC22 is electrically connected to the second processor EC21 via the circuit board EC23 and the system bus EC24. For example, the second electronic controller EC2 includes a semiconductor. The second processor EC21 includes a semiconductor. The second memory EC22 includes a semiconductor. However, the second electronic controller EC2 can be free of a semiconductor if needed or desired. The second processor EC21 can be free of a semiconductor if needed or desired. The second memory EC22 can be free of a semiconductor if needed or desired.

For example, the second processor EC21 includes at least one of a central processing unit (CPU), a micro processing unit (MPU), and a memory controller. The second memory EC22 is electrically connected to the second processor EC21. For example, the second memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically crasable programmable ROM (EEPROM), and a magnetic disc. The second memory EC22 includes storage areas each having an address. The second processor EC21 is configured to control the second memory EC22 to store data in the storage areas of the second memory EC22 and reads data from the storage areas of the second memory EC22. The second memory EC22 can also be referred to as a second hardware memory EC22. The second memory EC22 can also be referred to as a computer-readable storage medium EC22.

The second electronic controller EC2 is configured to execute at least one control algorithm of the second electric device ED1. For example, the second electronic controller EC2 is programed to execute at least one control algorithm of the second electric device ED1. The second memory EC22 stores at least one program including at least one program instruction. The at least one program is read into the second processor EC21, and thereby the at least one control algorithm of the second electric device ED1 is executed based on the at least one program. The second electronic controller EC2 can also be referred to as a second electronic controller circuit or circuitry EC2. The second electronic controller EC2 can also be referred to as a second electronic hardware controller circuit or circuitry EC2.

The structure of the second electronic controller EC2 is not limited to the above structure. The structure of the second electronic controller EC2 is not limited to the above structure. The structure of the second electronic controller EC2 is not limited to the second processor EC21 and the second memory EC22. The second electronic controller EC2 can be realized by hardware alone or a combination of hardware and software. In the present embodiment, the second processor EC21 and the second memory EC22 are integrated as a single chip such as an application specific integrated circuit (ASIC) or a field programmable gate array (FPGA). However, the second processor EC21 and the second memory EC22 can be separate chips if needed or desired. The second electronic controller EC2 can include the second processor EC21, the second memory EC22, the circuit board EC23, and the system bus EC24 if needed or desired. The second electronic controller EC2 can be at least two electronic controllers which are separately provided.

The second electronic controller EC2 can include at least two electronic controllers which are separately provided. The at least one control algorithm of the second electric device ED1 can be executed by the at least two electronic controllers if needed or desired. The second electronic controller EC2 can include at least two hardware processors which are separately provided. The second electronic controller EC2 can include at least two hardware memories which are separately provided. The at least one control algorithm of the second electric device ED1 can be executed by the at least two hardware processors if needed or desired. The at least one control algorithm of the second electric device ED1 can be stored in the at least two hardware memories if needed or desired. The second electronic controller EC2 can include at least two circuit boards which are separately provided if needed or desired. The second electronic controller EC2 can include at least two system buses which are separately provided if needed or desired.

As seen in FIG. 3, the second wireless communicator WC2 is electrically mounted on the circuit board EC23. The second wireless communicator WC2 is electrically mounted on the circuit board EC23. However, the second wireless communicator WC2 can be electrically mounted on another circuit board in a case where the second electronic controller EC2 includes at least two circuit boards. the second wireless communicator WC2 can be electrically mounted on another circuit board in a case where the second electronic controller EC2 includes at least two circuit boards. The second wireless communicator WC2 can be electrically mounted on an electric component other than a circuit board.

The second wireless communicator WC2 is electrically connected to the second processor EC21 and the second memory EC22 with the circuit board EC23 and the system bus EC24. The second wireless communicator WC2 includes a signal transmitting circuit or circuitry, a signal receiving circuit or circuitry, and an antenna. Thus, the second wireless communicator WC2 can also be referred to as a second wireless communicator circuit or circuitry WC2.

The second wireless communicator WC2 is configured to superimpose digital signals on carrier wave using a predetermined wireless communication protocol to wirelessly transmit signals. In the present embodiment, the second wireless communicator WC2 is configured to encrypt signals using a cryptographic key to generate encrypted wireless signals. The second wireless communicator WC2 is configured to transmit wireless signals via the antenna.

The second wireless communicator WC2 is configured to receive wireless signals via the antenna. In the present embodiment, the second wireless communicator WC2 is configured to decode the wireless signals to recognize signals transmitted from other wireless communicators. The second wireless communicator WC2 is configured to decrypt the wireless signals using the cryptographic key.

At least one of the second processor EC21, the second memory EC22, and the second wireless communicator WC2 can be integrally provided with another of the second processor EC21, the second memory EC22, and the second wireless communicator WC2 as a single chip if needed or desired. At least one of the second processor EC21, the second memory EC22, and the second wireless communicator WC2 can be a separate chip from another of the second processor EC21, the second memory EC22, and the second wireless communicator WC2 if needed or desired.

As seen in FIG. 3, the third electric device SP of the human-powered vehicle 10 comprises a third electronic controller EC3. The third electronic controller EC3 is configured to control the third wireless communicator WC3 to wirelessly communicate with the second wireless communicator WC2.

The third electronic controller EC3 includes a third processor EC31 and a third memory EC32. The third processor EC31 is coupled to the third memory EC32. The third memory EC32 is coupled to the third processor EC31. The third electric device SP includes a circuit board EC33 and a system bus EC34. The third processor EC31 and the third memory EC32 are electrically mounted on the circuit board EC33. The third processor EC31 is electrically connected to the third memory EC32 via the circuit board EC33 and the system bus EC34. The third memory EC32 is electrically connected to the third processor EC31 via the circuit board EC33 and the system bus EC34. For example, the third electronic controller EC3 includes a semiconductor. The third processor EC31 includes a semiconductor. The third memory EC32 includes a semiconductor. However, the third electronic controller EC3 can be free of a semiconductor if needed or desired. The third processor EC31 can be free of a semiconductor if needed or desired. The third memory EC32 can be free of a semiconductor if needed or desired.

For example, the third processor EC31 includes at least one of a central processing unit (CPU), a micro processing unit (MPU), and a memory controller. The third memory EC32 is electrically connected to the third processor EC31. For example, the third memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically crasable programmable ROM (EEPROM), and a magnetic disc. The third memory EC32 includes storage areas each having an address. The third processor EC31 is configured to control the third memory EC32 to store data in the storage areas of the third memory EC32 and reads data from the storage areas of the third memory EC32. The third memory EC32 can also be referred to as a third hardware memory EC32. The third memory EC32 can also be referred to as a computer-readable storage medium EC32.

The third electronic controller EC3 is configured to execute at least one control algorithm of the third electric device SP. For example, the third electronic controller EC3 is programed to execute at least one control algorithm of the third electric device SP. The third memory EC32 stores at least one program including at least one program instruction. The at least one program is read into the third processor EC31, and thereby the at least one control algorithm of the third electric device SP is executed based on the at least one program. The third electronic controller EC3 can also be referred to as a third electronic controller circuit or circuitry EC3. The third electronic controller EC3 can also be referred to as a third electronic hardware controller circuit or circuitry EC3.

The structure of the third electronic controller EC3 is not limited to the above structure. The structure of the third electronic controller EC3 is not limited to the third processor EC31 and the third memory EC32. The third electronic controller EC3 can be realized by hardware alone or a combination of hardware and software. In the present embodiment, the third processor EC31 and the third memory EC32 are integrated as a single chip such as an application specific integrated circuit (ASIC) or a field programmable gate array (FPGA). However, the third processor EC31 and the third memory EC32 can be separate chips if needed or desired. The third electronic controller EC3 can include the third processor EC31, the third memory EC32, the circuit board EC33, and the system bus EC34 if needed or desired. The third electronic controller EC3 can be at least two electronic controllers which are separately provided.

The third electronic controller EC3 can include at least two electronic controllers which are separately provided. The at least one control algorithm of the third electric device SP can be executed by the at least two electronic controllers if needed or desired. The third electronic controller EC3 can include at least two hardware processors which are separately provided. The third electronic controller EC3 can include at least two hardware memories which are separately provided. The at least one control algorithm of the third electric device SP can be executed by the at least two hardware processors if needed or desired. The at least one control algorithm of the third electric device SP can be stored in the at least two hardware memories if needed or desired. The third electronic controller EC3 can include at least two circuit boards which are separately provided if needed or desired. The third electronic controller EC3 can include at least two system buses which are separately provided if needed or desired.

As seen in FIG. 3, the third wireless communicator WC3 is electrically mounted on the circuit board EC33. The third wireless communicator WC3 is electrically mounted on the circuit board EC33. However, the third wireless communicator WC3 can be electrically mounted on another circuit board in a case where the third electronic controller EC3 includes at least two circuit boards. the third wireless communicator WC3 can be electrically mounted on another circuit board in a case where the third electronic controller EC3 includes at least two circuit boards. The third wireless communicator WC3 can be electrically mounted on an electric component other than a circuit board.

The third wireless communicator WC3 is electrically connected to the third processor EC31 and the third memory EC32 with the circuit board EC33 and the system bus EC34. The third wireless communicator WC3 includes a signal transmitting circuit or circuitry, a signal receiving circuit or circuitry, and an antenna. Thus, the third wireless communicator WC3 can also be referred to as a third wireless communicator circuit or circuitry WC3.

The third wireless communicator WC3 is configured to superimpose digital signals on carrier wave using a predetermined wireless communication protocol to wirelessly transmit signals. In the present embodiment, the third wireless communicator WC3 is configured to encrypt signals using a cryptographic key to generate encrypted wireless signals. The third wireless communicator WC3 is configured to transmit wireless signals via the antenna.

The third wireless communicator WC3 is configured to receive wireless signals via the antenna. In the present embodiment, the third wireless communicator WC3 is configured to decode the wireless signals to recognize signals transmitted from other wireless communicators. The third wireless communicator WC3 is configured to decrypt the wireless signals using the cryptographic key.

At least one of the third processor EC31, the third memory EC32, and the third wireless communicator WC3 can be integrally provided with another of the third processor EC31, the third memory EC32, and the third wireless communicator WC3 as a single chip if needed or desired. At least one of the third processor EC31, the third memory EC32, and the third wireless communicator WC3 can be a separate chip from another of the third processor EC31, the third memory EC32, and the third wireless communicator WC3 if needed or desired.

The third electric device SP includes a display unit SP8. The display unit SP8 is configured to display information relating to the human-powered vehicle 10. The third electronic controller EC3 is electrically connected to the display unit SP8 to control the display unit SP8.

The third electric device SP includes a user interface SP9. The user interface SP9 is configured to receive a user input U9. The user interface SP9 includes a touch screen provided on the display unit SP8. The user interface SP9 can include another type of interface such as a button and a dial. The user input U9 includes a start of a pairing mode of the third electric device SP. However, the user input U9 can include information other than the start of the pairing.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, the first wireless communicator WC1 is configured to at least receive a wireless signal. The second wireless communicator WC2 is configured to at least receive a wireless signal. The third wireless communicator WC3 is configured to at least receive a wireless signal. For example, the first wireless communicator WC1 is a two-way wireless transceiver that conducts two-way wireless communications using the wireless receiver for wirelessly receiving signals and a wireless transmitter for wirelessly transmitting signals.

In the present embodiment, the wireless signals of the first wireless communicator WC1, the second wireless communicator WC2, and the third wireless communicator WC3 can be radio frequency (RF) signals, ultra-wide band communication signals, radio frequency identification (RFID), Wi-Fi (registered trademark), Zigbee (registered trademark), ANT+ (registered trademark) communications, or Bluetooth (registered trademark) communications or any other type of signal suitable for short range wireless communications as understood in the human-powered vehicle field. It should also be understood that each of the first wireless communicator WC1, the second wireless communicator WC2, and the third wireless communicator WC3 can transmit the signals at a particular or randomly selected frequency and/or with an identifier such as a particular code, to distinguish the wireless control signal from other wireless control signals. In this way, each of the first electric device FS, the second electric device ED1, and the third electric device SP can recognize which control signals are to be acted upon and which control signals are not to be acted upon. Thus, each of the first electric device FS, the second electric device ED1, and the third electric device SP can ignore the control signals from other wireless communicators of other electric devices. The first wireless communicator WC1, the second wireless communicator WC2, and the third wireless communicator WC3 use the same wireless communication protocol.

The first wireless communicator WC1 is configured to wirelessly communicate with the second wireless communicator WC2 of the second electric device ED1 using a communication protocol. The second wireless communicator WC2 is configured to wirelessly communicate with the first wireless communicator WC1 of the first electric device FS using the communication protocol. Namely, the first wireless communicator WC1 and the second wireless communicator WC2 use the same communication protocol.

The third wireless communicator WC3 is configured to wirelessly communicate with the second wireless communicator WC2 of the second electric device ED1 using the communication protocol. The second wireless communicator WC2 is configured to wirelessly communicate with a third wireless communicator WC3 of a third electric device SP using the communication protocol. Namely, the first wireless communicator WC1, the second wireless communicator WC2, and the third wireless communicator WC3 use the same communication protocol.

The first wireless communicator WC1 can be configured to wirelessly communicate with the third wireless communicator WC3 of the third electric device SP using the communication protocol if needed or desired.

Examples of the communication protocol include Bluetooth (registered trademark), Wi-Fi (registered trademark), Zigbee (registered trademark), and ANT+ (registered trademark). However, the communication protocol is not limited to the above protocols.

As seen in FIG. 3, the first wireless communicator WC1 is configured to execute pairing with the second wireless communicator WC2. The second wireless communicator WC2 is configured to execute pairing with the first wireless communicator WC1. For example, the first electric device FS is configured to be in a pairing mode in response to a long press of the user interface FS8. The second electric device ED1 is configured to be in a pairing mode in response to a long press of the user interface ED11.

The second electronic controller EC2 is configured to control, based on a pairing request input U14, the second wireless communicator WC2 to wirelessly transmit a pairing request signal PS2 indicating a request to start pairing between the second electric device ED1 and at least one electric device. For example, the second electronic controller EC2 is configured to control, based on the pairing request input U14, the second wireless communicator WC2 to wirelessly transmit the pairing request signal PS2 indicating the request to start pairing between the first electric device FS and the second electric device ED1. For example, the pairing request signal PS2 includes an advertisement signal having no specified recipient. Thus, the pairing request signal PS2 can also be referred to as an advertisement signal PS2.

The second electronic controller EC2 is configured to control the second wireless communicator WC2 to be in a pairing mode in response to the pairing request input U14. The second electronic controller EC2 is configured to control the second wireless communicator WC2 to wirelessly transmit the pairing request signal PS2 indicating the request to start pairing in the pairing mode.

The pairing request signal PS2 includes second pairing information ID2 of the second electric device ED1. The second pairing information ID2 includes at least one of second identification information and second cryptographic key information. The second identification information includes a unique number indicating the second electric device ED1. Examples of the unique number include an address of the second electric device ED1. The second cryptographic key information includes a second cryptographic key. Another wireless communicator encrypts information using the second cryptographic key information, and the second wireless communicator WC2 decrypts the encrypted information using the second cryptographic key information. The second electronic controller EC2 is configured to store the second pairing information ID2 in the second memory EC22.

In the present embodiment, the pairing request input U14 is the same manner as the additional user input U13. Namely, the user interface ED8 is configured to receive the pairing request input U14. The additional electric switch SW13 is configured to be activated in response to the pairing request input U14. However, the pairing request input U14 can be a manner different from the additional user input U13 if needed or desired. For example, the pairing request input U14 can be a long press or multiple presses of the electric switch SW11 of the user interface ED8 or a concurrent press of the electric switch SW11 and the additional electric switch SW13 if needed or desired.

The first wireless communicator WC1 is configured to detect the pairing request signal PS2 wirelessly transmitted from the second wireless communicator WC2 during pairing. The first electronic controller EC1 is configured to store the second identification of the second pairing information ID2 included in the pairing request signal PS2 in the first memory EC12 in the case where the first electronic controller EC1 detects the pairing request signal PS2. Thus, the first memory EC12 is configured to store the second pairing information ID2 of the second electric device ED1 received during pairing. The first memory EC12 is configured to store the second pairing information ID2 of the second electric device ED1 received during pairing executed between the first electric device FS and the second electric device ED1.

The first electronic controller EC1 is configured to control the first wireless communicator WC1 to wirelessly transmit a pairing response signal PS1 in a case where the first electronic controller EC1 detects the pairing request signal PS2. The pairing response signal PS1 includes first pairing information ID1 of the first electric device FS. The first pairing information ID1 includes at least one of first identification information and first cryptographic key information. The first identification information includes a unique number indicating the first electric device FS. Examples of the unique number include an address of the first electric device FS. The first cryptographic key information includes a first cryptographic key. Another wireless communicator encrypts information using the first cryptographic key information, and the first wireless communicator WC1 decrypts the encrypted information using the first cryptographic key information. The first electronic controller EC1 is configured to store the first pairing information ID1 in the first memory EC12.

In the present embodiment, the first electronic controller EC1 is configured to control the first wireless communicator WC1 to wirelessly transmit the pairing response signal PS1 in response to the pairing request signal PS2. However, the first electronic controller EC1 can be configured to control the first wireless communicator WC1 to wirelessly transmit the pairing response signal PS1 in response to another trigger other than the pairing request signal PS2 if needed or desired. Examples of the other trigger includes the user input U8 received by the user interface FS8 and power-on caused by attachment of the electric power source FS5. Examples of the user input U8 include at least one of the start of the pairing mode, the power-on, and the power-off. In such modifications, the first wireless communicator WC1 does not wirelessly transmit the pairing response signal PS1 when receiving the pairing request signal PS2. Transmissions of signals can be executed between the first wireless communicator WC1 and the second wireless communicator WC2 until the user interface FS8 receives the user input U8 after the first wireless communicator WC1 wirelessly receives the pairing request signal PS2.

The second wireless communicator WC2 is configured to detect the pairing response signal PS1 wirelessly transmitted from the first wireless communicator WC1 during pairing. The second electronic controller EC2 is configured to store the first identification information of the first pairing information ID1 included in the pairing response signal PS1 in the second memory EC22 in the case where the second electronic controller EC2 detects the pairing response signal PS1. Thus, the second memory EC22 is configured to store first pairing information ID1 of the first electric device FS received during pairing. The second memory EC22 is configured to store the first pairing information ID1 of the first electric device FS received during pairing executed between the first electric device FS and the second electric device ED1.

The second electronic controller EC2 is configured to control, based on the pairing response signal PS1, the second wireless communicator WC2 to wirelessly transmit a pairing signal PS21. The pairing signal PS21 includes the second pairing information ID2 including the second cryptographic key information.

The first wireless communicator WC1 is configured to detect the pairing signal PS21. The first electronic controller EC1 is configured to store the second cryptographic key information of the second pairing information ID2 included in the pairing signal PS21 in the first memory EC12 in the case where the first electronic controller EC1 detects the pairing signal PS21. Namely, the first memory EC12 is configured to store the second cryptographic key information of the second pairing information ID2. The first electronic controller EC2 is configured to encrypts information using the second cryptographic key information and to wirelessly transmit the encrypted information. The second electronic controller EC1 is configured to decrypts, using the second cryptographic key information, the encrypted information wirelessly transmitted from the first electric device FS.

The first electronic controller EC1 is configured to control, based on the pairing signal PS21, the first wireless communicator WC1 to wirelessly transmit a pairing signal PS11. The pairing signal PS11 includes the first cryptographic key information of the first pairing information ID1

The second wireless communicator WC2 is configured to detect the pairing signal PS11. The second electronic controller EC2 is configured to store the first cryptographic key information of the first pairing information ID1 included in the pairing signal PS11 in the second memory EC22 in the case where the second electronic controller EC2 detects the pairing signal PS11. Namely, the second memory EC22 is configured to store the first cryptographic key information of the second pairing information ID2. The second electronic controller EC2 is configured to encrypts information using the first cryptographic key information and to wirelessly transmit the encrypted information. The second electronic controller EC2 is configured to decrypts, using the first cryptographic key information, the encrypted information wirelessly transmitted from the second electric device ED1.

Accordingly, the first wireless communicator WC1 and the second wireless communicator WC2 are paired during pairing. The first memory EC12 stores the second pairing information ID2 in a paired state where the first wireless communicator WC1 and the second wireless communicator WC2 are paired. The second memory EC22 stores the first pairing information ID1 in the paired state where the first wireless communicator WC1 and the second wireless communicator WC2 are paired.

In a connection state where the first wireless communicator WC1 and the second wireless communicator WC2 are paired and where the first wireless communicator WC1 and the second wireless communicator WC2 are wirelessly connected, the first wireless communicator WC1 recognizes signals wirelessly transmitted from the second wireless communicator WC2, and the second wireless communicator WC2 recognizes signals wirelessly transmitted from the first wireless communicator WC1. The connection state includes the paired state.

Figure 4:
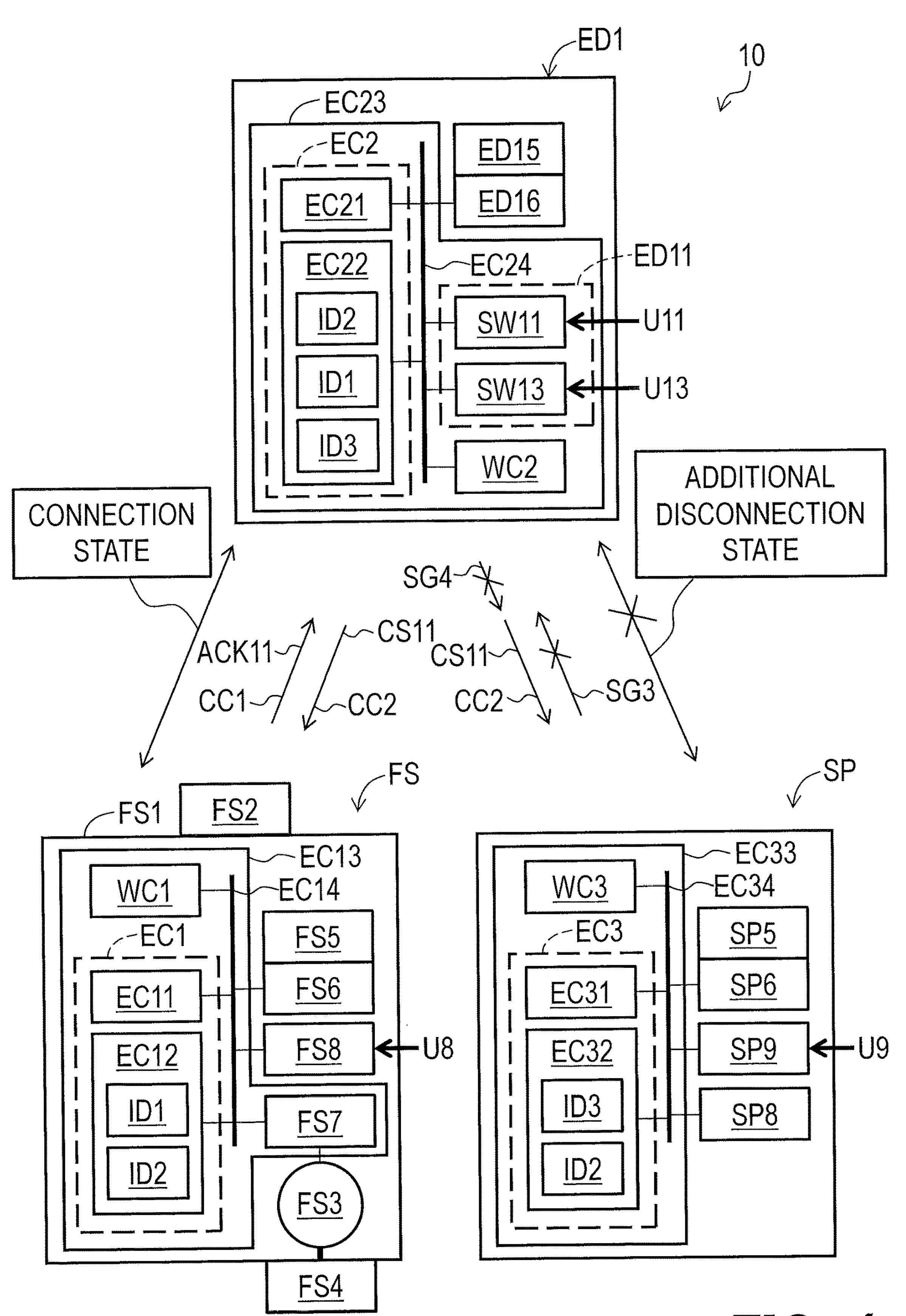

As seen in FIG. 4, the first wireless communicator WC1 is configured to wirelessly communicate with the second wireless communicator WC2 of the second electric device ED1 using the communication protocol in the connection state where the first wireless communicator WC1 is paired with the second wireless communicator WC2 and where the first wireless communicator WC1 is wirelessly connected to the second wireless communicator WC2. The second wireless communicator WC2 is configured to wirelessly communicate with the first wireless communicator WC1 of the first electric device FS using the communication protocol in the connection state where the second wireless communicator WC2 is paired with the first wireless communicator WC1 and where the second wireless communicator WC2 is wirelessly connected to the first wireless communicator WC1.

A state where the first wireless communicator WC1 is paired with the second wireless communicator WC2 includes a state where the first memory EC12 stores the second pairing information ID2. The state where the first wireless communicator WC1 is paired with the second wireless communicator WC2 includes a state where the second memory EC22 stores the first pairing information ID1.

A state where the second wireless communicator WC2 is paired with the first wireless communicator WC1 includes the state where the second memory EC22 stores the first pairing information ID1. The state where the second wireless communicator WC2 is paired with the first wireless communicator WC1 includes the state where the first memory EC12 stores the second pairing information ID2.

Namely, the first wireless communicator WC1 is configured to wirelessly communicate with the second wireless communicator WC2 of the second electric device ED1 using the communication protocol in the connection state where the first memory EC12 stores the second pairing information ID2 and where the first wireless communicator WC1 is wirelessly connected to the second wireless communicator WC2. The second wireless communicator WC2 is configured to wirelessly communicate with the first wireless communicator WC1 of the first electric device FS using the communication protocol in the connection state where the second memory EC22 stores the first pairing information ID1 and where the second wireless communicator WC2 is wirelessly connected to the first wireless communicator WC1.

As seen in FIG. 4, the second wireless communicator WC2 is configured to wirelessly transmit a connection signal CC2 periodically after the completion of pairing. The second electronic controller EC2 is configured to control the second wireless communicator WC2 to wirelessly transmit the connection signal CC2 periodically after the completion of pairing. The connection signal CC2 includes the first pairing information ID1 in the paired state where the second wireless communicator WC2 is paired with the first wireless communicator WC1. The connection signal CC2 can include information which is the same as or different from the information included in the pairing request signal PS2. The connection signal CC2 can include information other than the first pairing information ID1 if needed or desired.

The first wireless communicator WC1 is configured to wirelessly receive the connection signal CC2 after the completion of pairing. The first electronic controller EC1 is configured to recognize the connection signal CC2 when the first wireless communicator WC1 wirelessly receives the connection signal CC2. Thus, the first electronic controller EC1 is configured to recognize that the first wireless communicator WC1 is wirelessly connected to the second wireless communicator WC2 based on the connection signal CC2.

The first wireless communicator WC1 is configured to wirelessly transmit a connection acknowledge signal CC1 in response to the receipt of the connection signal CC2. The first electronic controller EC1 is configured to control the first wireless communicator WC1 to wirelessly transmit the connection acknowledge signal CC1 in response to the receipt of the connection signal CC2. The connection acknowledge signal CC1 includes the second pairing information ID2 in the paired state where the first wireless communicator WC1 is paired with the second wireless communicator WC2. The connection acknowledge signal CC1 can include information which is the same as or different from the information included in the pairing response signal PS1. The connection acknowledge signal CC1 can include information other than the second pairing information ID2 if needed or desired.

The second wireless communicator WC2 is configured to wirelessly receive the connection acknowledge signal CC1 wirelessly transmitted from the first wireless communicator WC1. The second electronic controller EC2 is configured to recognize the connection acknowledge signal CC1 when the second wireless communicator WC2 wirelessly receives the connection acknowledge signal CC1. Thus, the second electronic controller EC2 is configured to recognize that the second wireless communicator WC2 is wirelessly connected to the first wireless communicator WC1 based on the connection acknowledge signal CC1.

As seen in FIG. 4, the first electronic controller EC1 and the first wireless communicator WC1 are configured to recognize signals wirelessly transmitted from the second wireless communicator WC2 in the connection state. The second electronic controller EC2 and the second wireless communicator WC2 are configured to recognize signals wirelessly transmitted from the first wireless communicator WC1 in the connection state.

For example, the first electronic controller EC1 is configured to control the electric actuator FS3 to generate the actuation force based on the user input U11 received by the second electric device ED1 in the connection state where the first wireless communicator WC1 is paired with the second wireless communicator WC2 and where the first wireless communicator WC1 is wirelessly connected to the second wireless communicator WC2. The first electronic controller EC1 is configured to control the electric actuator FS3 to generate the actuation force in response to the control signal CSI wirelessly transmitted from the second wireless communicator WC2 in the connection state where the first wireless communicator WC1 is paired with the second wireless communicator WC2 and where the first wireless communicator WC1 is wirelessly connected to the second wireless communicator WC2.

The first electronic controller EC1 is configured to control the first wireless communicator WC1 to wirelessly transmit an acknowledge signal ACK11 to the second wireless communicator WC2 in response to the receipt of the control signal CS11. The second electronic controller EC2 and the second wireless communicator WC2 are configured to recognize the acknowledge signal ACK11 in the connection state. Thus, the second electronic controller EC2 and the second wireless communicator WC2 recognizes that the second electric device ED1 is in the connection state based on the acknowledge signal ACK11. The acknowledge signal ACK11 includes the second pairing information ID2 in the paired state where the first wireless communicator WC1 is paired with the second wireless communicator WC2.

Figure 5:
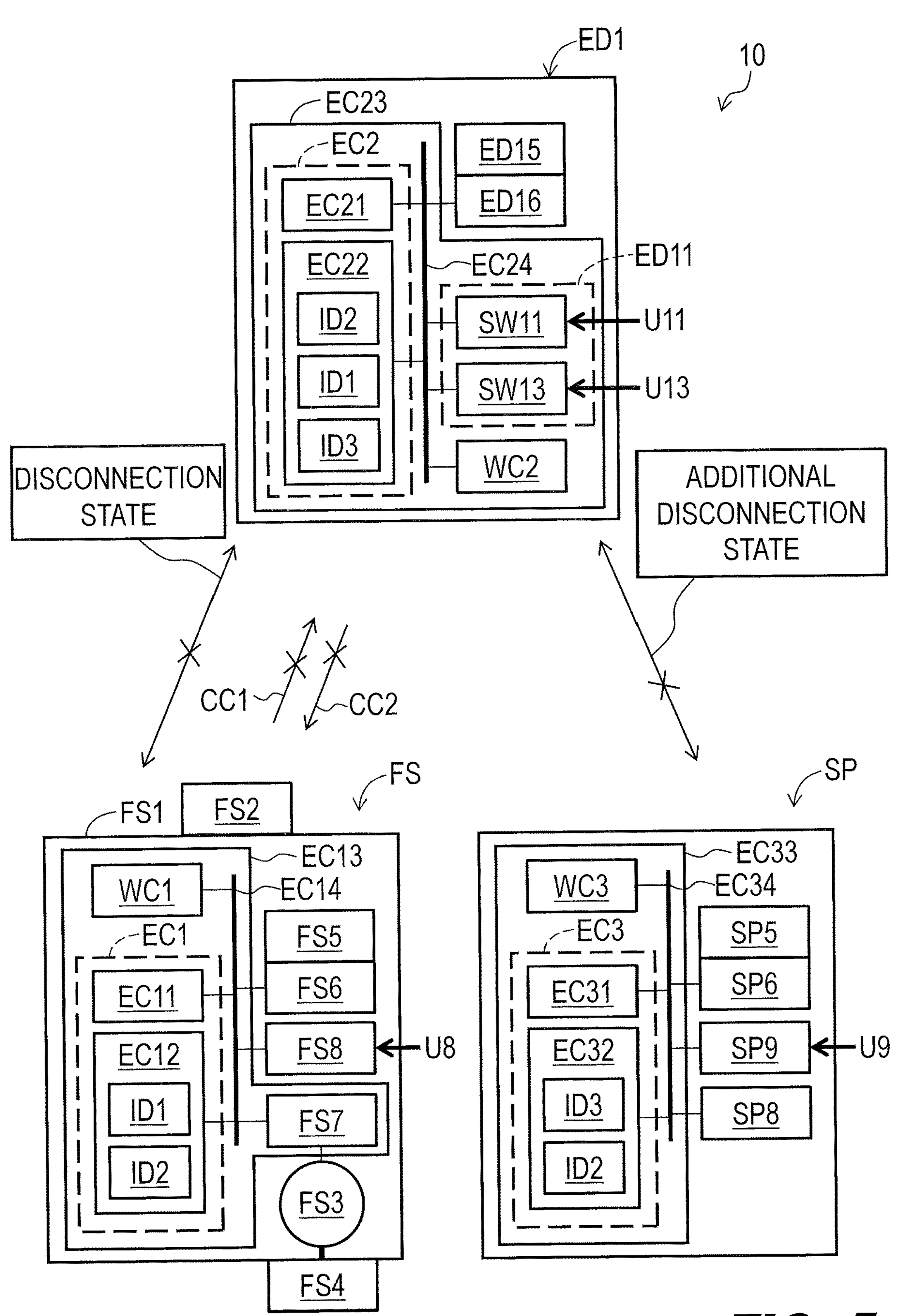

As seen in FIG. 5, the first wireless communicator WC1 is configured to be wirelessly disconnected from the second wireless communicator WC2 based on a disconnection operation performed for at least one of the first electric device FS and the second electric device ED1. The second wireless communicator WC2 is configured to be wirelessly disconnected from the first wireless communicator WC1 based on the disconnection operation performed for at least one of the first electric device FS and the second electric device ED1.

For example, the disconnection operation includes at least one of detaching the first electric power source FS5 from the first power source holder FS6, turning the first electric device FS off, receiving a user disconnection input by the first electric device FS, detaching the second electric power source ED15 from the second power source holder ED16, turning the second electric device ED1 off, receiving a user disconnection input by the second electric device ED1, and separating one of the first electric device FS and the second electric device ED1 from the other of the first electric device FS and the second electric device ED1 beyond a maximum communication distance.

The second wireless communicator WC2 does not wirelessly transmit the connection signal CC2 in a case where the second electric power source ED15 is detached from the second power source holder ED16, where the second electric device ED1 is turned off, or where the second electric device ED1 receives the user disconnection input. The first wireless communicator WC1 does not wirelessly receive the connection signal CC2 since the second wireless communicator WC2 does not wirelessly transmit the connection signal CC2. Thus, the first electronic controller EC1 recognizes that the first wireless communicator WC1 is wirelessly disconnected from the second wireless communicator WC2 based on lack of the connection signal CC2.

The first wireless communicator WC1 does not wirelessly transmit the connection acknowledge signal CC1 in a case where the first electric power source FS5 is detached from the first power source holder FS6, where the first electric device FS is turned off, or where the first electric device FS receives the user disconnection input. The second wireless communicator WC1 does not wirelessly receive the connection acknowledge signal CC1 since the first wireless communicator WC1 does not wirelessly transmit the connection acknowledge signal CC1. Thus, the second electronic controller EC2 recognizes that the second wireless communicator WC1 is wirelessly disconnected from the first wireless communicator WC1 based on lack of the connection acknowledge signal CC1.

As seen in FIG. 5, the first wireless communicator WC1 is configured to be free of controlling the electric actuator FS3 to generate the actuation force based on the user input U11 received by the second electric device ED1 in a disconnection state where the first wireless communicator WC1 is paired with the second wireless communicator WC2 and where the first wireless communicator WC1 is wirelessly disconnected from the second wireless communicator WC2. The first wireless communicator WC1 is configured to be free of controlling the electric actuator FS3 to generate the actuation force in response to the control signal CS11 wirelessly transmitted from the second electric device ED1 in the disconnection state.

The disconnection state includes a state where the first wireless communicator WC1 is paired with the second wireless communicator WC2 and where the first wireless communicator WC1 is wirelessly disconnected from the second wireless communicator WC2. The disconnection state includes a state where the second wireless communicator WC2 is paired with the first wireless communicator WC1 and where the second wireless communicator WC2 is wirelessly disconnected from the first wireless communicator WC1. Namely, the disconnection state includes the paired state.

The first electric device FS is configured to be in a power-off state in a case where the first electric power source FS5 is detached from the first power source holder FS6 or where the first electric device FS is turned off. The second electric device ED1 is configured to be in a power-off state in a case where the second electric power source ED15 is detached from the second power source holder ED16 or where the second electric device ED1 is turned off.

The first electric device FS is configured to change a state of the first electric device FS from the power-off state to the disconnection state based on a first recovery operation performed for the first electric device FS. The first recovery operation includes at least one of attaching the first electric power source FS5 to the first power source holder FS6 and turning the first electric device FS on.

The second electric device ED1 is configured to change a state of the second electric device ED1 from the power-off state to the disconnection state based on a second recovery operation performed for the second electric device ED1. The second recovery operation includes at least one of attaching the second electric power source ED15 to the second power source holder ED16 and turning the second electric device ED1 on.

Figure 6:
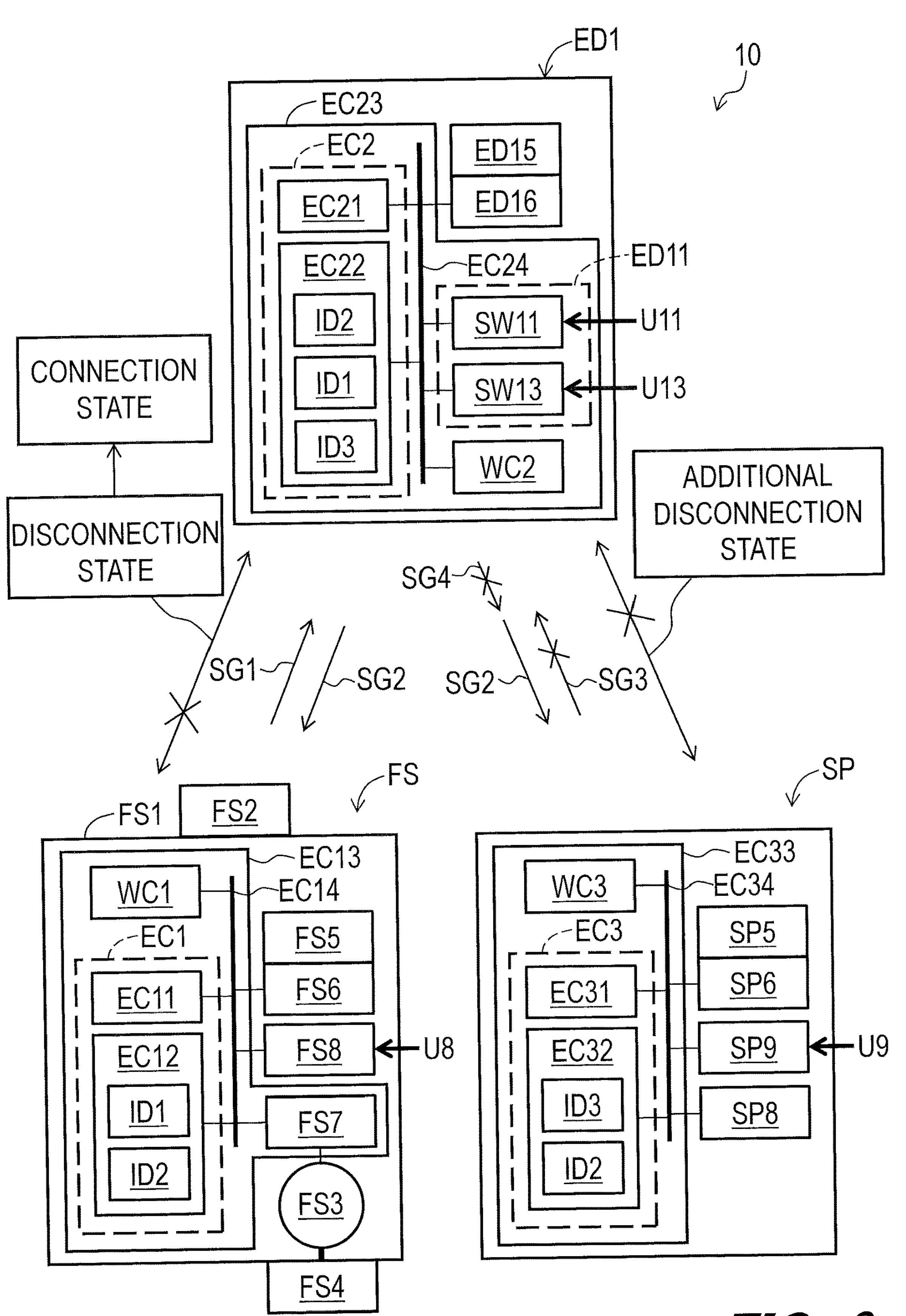

As seen in FIG. 6, the first electronic controller EC1 is configured to control the first wireless communicator WC1 to reconnect to the second wireless communicator WC2 based on the user input U11 received by the second electric device ED1 in the disconnection state where the first wireless communicator WC1 is paired with the second wireless communicator WC2 and where the first wireless communicator WC1 is wirelessly disconnected from the second wireless communicator WC2. The first electronic controller EC1 is configured to control the first wireless communicator WC1 to reconnect to the second wireless communicator WC2 based on the user input U11 received by the second electric device ED1 in the disconnection state where the first memory EC12 stores the second pairing information ID2 and where the first wireless communicator WC1 is wirelessly disconnected from the second wireless communicator WC2.

For example, the second wireless communicator WC2 is configured to wirelessly transmit a second signal SG2 based on the user input U11. The second electronic controller EC2 is configured to control the second wireless communicator WC2 to wirelessly transmit the second signal SG2 to the first electric device FS based on the user input U11 received by the user interface ED11. The second electronic controller EC2 is configured to control the second wireless communicator WC2 to wirelessly transmit the second signal SG2 to the first electric device FS based on the user input U11 received by the user interface ED11 in the disconnection state. For example, the second signal SG2 includes the first pairing information ID1 of the first electric device FS. The second electronic controller EC2 can be configured to control the second wireless communicator WC2 to wirelessly transmit the second signal SG2 including the first pairing information ID1 to the first electric device FS based on the user input U11 in the connection state if needed or desired.

The first electronic controller EC1 is configured to control the first wireless communicator WC1 to reconnect to the second wireless communicator WC2 based on the second signal SG2. The first electronic controller EC1 is configured to control the first wireless communicator WC1 to reconnect to the second wireless communicator WC2 in response to receipt of the second signal SG2 in the disconnection state.

The first electronic controller EC1 is configured to control the first wireless communicator WC1 to wirelessly transmit a first signal SG1 based on the user input U11 received by the second electric device ED1 in the disconnection state. The first electronic controller EC1 is configured to control the first wireless communicator WC1 to wirelessly transmit the first signal SG1 based on the second signal SG2 in the disconnection state. The first electronic controller EC1 is configured to control the first wireless communicator WC1 to wirelessly transmit the first signal SG1 in response to receipt of the second signal SG2 in the disconnection state. For example, the first signal SG1 includes the second pairing information ID2 of the second electric device ED1.

The second electronic controller EC2 is configured to control the second wireless communicator WC2 to reconnect to the first wireless communicator WC1 based on the user input U11 in the disconnection state where the second wireless communicator WC2 is paired with the first wireless communicator WC1 and where the second wireless communicator WC2 is wirelessly disconnected from the first wireless communicator WC1. The second electronic controller EC2 is configured to control the second wireless communicator WC2 to reconnect the first wireless communicator WC1 of the first electric device FS based on the user input U11 in the disconnection state where the second memory EC22 stores the first pairing information ID1 and where the second wireless communicator WC2 is wirelessly disconnected from the first wireless communicator WC1.

The second electronic controller EC2 is configured to control the second wireless communicator WC2 to reconnect to the first wireless communicator WC1 based on the first signal SG1 wirelessly transmitted from the first wireless communicator WC1 of the first electric device FS in the disconnection state. The second electronic controller EC2 is configured to control the second wireless communicator WC2 to reconnect to the first wireless communicator WC1 in response to receipt of the first signal SG1 in the disconnection state.

As seen in FIG. 3, the third wireless communicator WC3 is configured to execute pairing with the second wireless communicator WC2. The second wireless communicator WC2 is configured to execute pairing with the third wireless communicator WC3. For example, the third electric device SP is configured to be in a pairing mode in response to a press of the user interface SP9. The third electric device SP is configured to be in the pairing mode in response to a touch panel operation of an icon or word which is displayed in the display unit SP8 and which is indicative of a start of pairing. The third electric device SP can be configured to be in the pairing mode in response to a touch panel operation of an icon or word which is displayed in the display unit SP8 and which is indicative of the second electric device ED2. The touch panel operation can include a normal tap, a long tap, or multiple taps. The second electric device ED1 is configured to be in the pairing mode in response to the long press of the user interface ED11.

The second electronic controller EC2 is configured to control the second wireless communicator WC2 to wirelessly transmit the pairing request signal PS2. For example, the second electronic controller EC2 is configured to control the second wireless communicator WC2 to wirelessly transmit the pairing request signal PS2 in response to the long press of the user interface ED11.

The third wireless communicator WC3 is configured to detect the pairing request signal PS2 wirelessly transmitted from the second wireless communicator WC2. The third electronic controller EC3 is configured to store the second pairing information ID2 included in the pairing request signal PS2 in the third memory EC32 in the case where the third electronic controller EC3 detects the pairing request signal PS2. Thus, the third memory EC32 is configured to store the second pairing information ID2 of the second electric device ED1 received during pairing. The third memory EC32 is configured to store the second pairing information ID2 of the second electric device ED1 received during pairing executed between the second electric device ED1 and the third electric device SP.

The third electronic controller EC3 is configured to control the third wireless communicator WC3 to wirelessly transmit a pairing response signal PS3 in a case where the third electronic controller EC3 detects the pairing request signal PS2. The pairing response signal PS3 includes third pairing information ID3 of the third electric device SP. The third pairing information ID3 includes a unique number indicating the third electric device SP and a third cryptographic key. Another wireless communicator encrypts information using the third cryptographic key, and the third wireless communicator WC3 decrypts the encrypted information. The third electronic controller EC3 is configured to store the third pairing information ID3 in the third memory EC32.

The second electronic controller EC2 is configured to control the second wireless communicator WC2 to detect the pairing response signal PS3 wirelessly transmitted from the third wireless communicator WC3. The second electronic controller EC2 is configured to store the third pairing information ID3 included in the pairing response signal PS3 in the second memory EC22 in the case where the second electronic controller EC2 detects the pairing response signal PS3. Thus, the second memory EC22 is configured to store third pairing information ID3 of the third electric device SP received during pairing. The second memory EC22 is configured to store the third pairing information ID3 of the third electric device SP received during pairing executed between the second electric device ED1 and the third electric device SP.

Accordingly, the third wireless communicator WC3 and the second wireless communicator WC2 are paired during pairing. The third memory EC32 stores the second pairing information ID2 in an additional paired state where the second wireless communicator WC2 and the third wireless communicator WC3 are paired. The third memory EC32 stores the second pairing information ID2 in the additional paired state where the second wireless communicator WC2 and the third wireless communicator WC3 are paired.

In an additional connection state where the third wireless communicator WC3 and the second wireless communicator WC2 are paired and where the third wireless communicator WC3 and the second wireless communicator WC2 are wirelessly connected, the third wireless communicator WC3 recognizes signal wirelessly transmitted from the second wireless communicator WC2, and the second wireless communicator WC2 recognizes signal wirelessly transmitted from the third wireless communicator WC3. The additional connection state includes the additional paired state.

In the present embodiment, the second wireless communicator WC2 is configured to be in at least one of the disconnection state and the additional disconnection state. The second wireless communicator WC2 is configured to be in both the disconnection state and the additional disconnection state at one time. However, the second wireless communicator WC2 can be configured to be in only one of the disconnection state and the additional disconnection state if needed or desired.

In the present embodiment, the second wireless communicator WC2 is configured to be in only one of the connection state and the additional connection state at one time. The second wireless communicator WC2 is wirelessly connected to only one wireless communicator at one time. For example, the second wireless communicator WC2 is wirelessly connected to only one of the first wireless communicator WC1 and the third wireless communicator WC3 at one time. However, the second wireless communicator WC2 can be configured to be in both the connection state and the additional connection state at one time if needed or desired. The second wireless communicator WC2 can be configured to be wirelessly connected to at least two wireless communicators at one time if needed or desired. The second wireless communicator WC2 can be configured to be wirelessly connected to the first wireless communicator WC1 and the third wireless communicator WC3 at one time if needed or desired.

Figure 7:
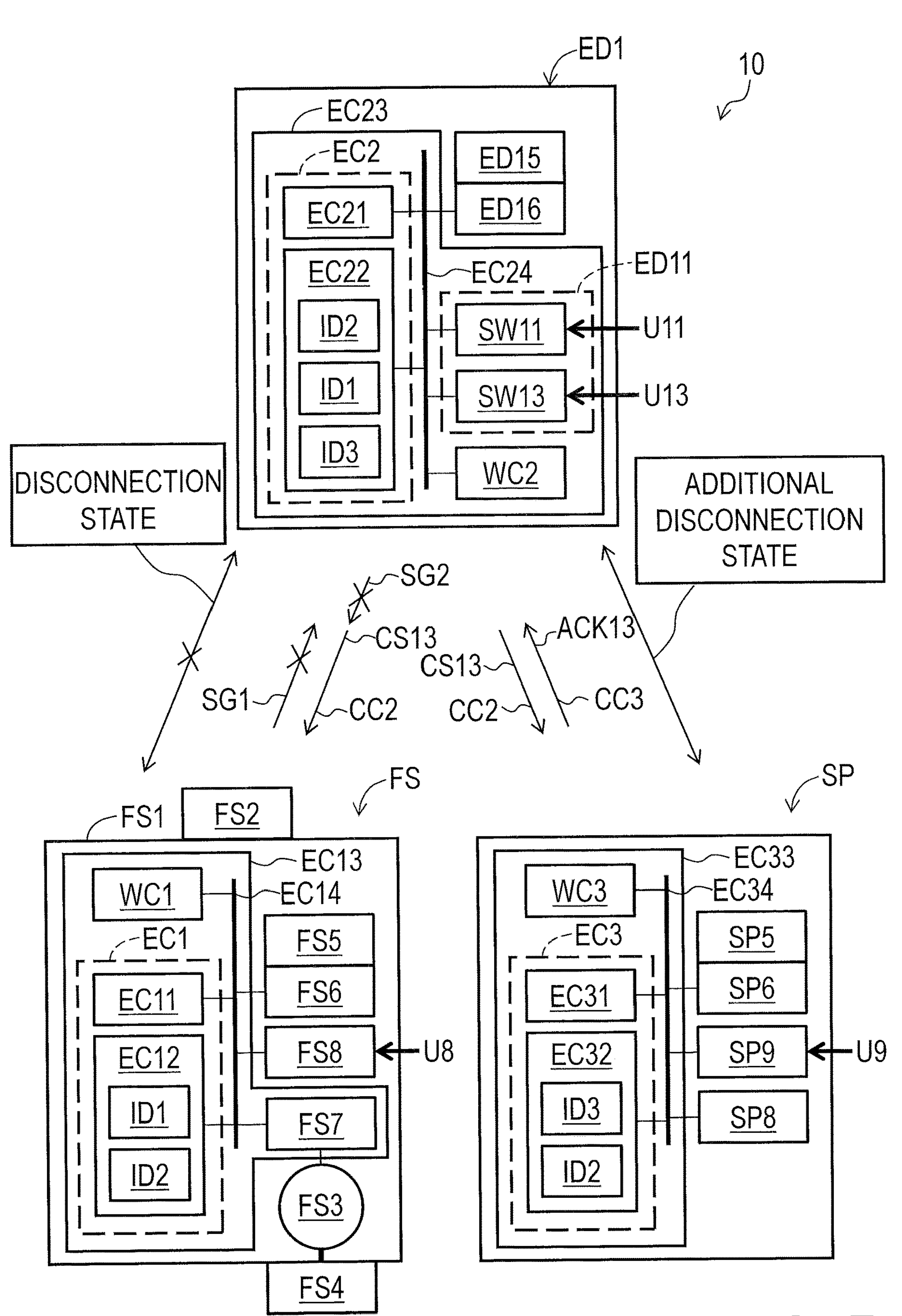

As seen in FIG. 7, the second wireless communicator WC2 is configured to wirelessly communicate with the third wireless communicator WC3 of the third electric device SP using the communication protocol in the additional connection state where the second wireless communicator WC2 is paired with the third wireless communicator WC3 and where the second wireless communicator WC2 is wirelessly connected to the third wireless communicator WC3. The third wireless communicator WC3 is configured to wirelessly communicate with the second wireless communicator WC2 of the second electric device ED1 using the communication protocol in the additional connection state where the third wireless communicator WC3 is paired with the second wireless communicator WC2 and where the third wireless communicator WC3 is wirelessly connected to the second wireless communicator WC2.

A state where the second wireless communicator WC2 is paired with the third wireless communicator WC3 includes a state where the second memory EC22 stores the third pairing information ID3. The state where the second wireless communicator WC2 is paired with the third wireless communicator WC3 includes a state where the third memory stores the second pairing information ID2.

A state where the third wireless communicator WC3 is paired with the second wireless communicator WC2 includes the state where the third memory stores the second pairing information ID2. The state where the third wireless communicator WC3 is paired with the second wireless communicator WC2 includes the state where the second memory EC22 stores the third pairing information ID3.

Namely, the second wireless communicator WC2 is configured to wirelessly communicate with the third wireless communicator WC3 of the third electric device SP using the communication protocol in the additional connection state where the second memory EC22 stores the third pairing information ID3 and where the second wireless communicator WC2 is wirelessly connected to the third wireless communicator WC3. The third wireless communicator WC3 is configured to wirelessly communicate with the second wireless communicator WC2 of the second electric device ED1 using the communication protocol in the connection state where the third memory stores the second pairing information ID2 and where the third wireless communicator WC3 is wirelessly connected to the second wireless communicator WC2.

As seen in FIG. 7, the second wireless communicator WC2 is configured to wirelessly transmit a connection signal CC2 periodically after the completion of pairing. The second electronic controller EC2 is configured to control the second wireless communicator WC2 to wirelessly transmit the connection signal CC2 periodically after the completion of pairing. The connection signal CC2 includes the third pairing information ID3 in the paired state where the second wireless communicator WC2 is paired with the third wireless communicator WC3.

The third wireless communicator WC3 is configured to wirelessly receive the connection signal CC2 after the completion of pairing. The third electronic controller EC3 is configured to recognize the connection signal CC2 when the third wireless communicator WC3 wirelessly receives the connection signal CC2. Thus, the third electronic controller EC3 is configured to recognize that the third wireless communicator WC3 is wirelessly connected to the second wireless communicator WC2 based on the connection signal CC2.

The third wireless communicator WC3 is configured to wirelessly transmit a connection acknowledge signal CC3 in response to the receipt of the connection signal CC2. The third electronic controller EC3 is configured to control the third wireless communicator WC3 to wirelessly transmit the connection acknowledge signal CC3 in response to the receipt of the connection signal CC2. The connection acknowledge signal CC3 includes the second pairing information ID2 in the paired state where the third wireless communicator WC3 is paired with the second wireless communicator WC2.

The second wireless communicator WC2 is configured to wirelessly receive the connection acknowledge signal CC3 wirelessly transmitted from the third wireless communicator WC3. The second electronic controller EC2 is configured to recognize the connection acknowledge signal CC3 when the second wireless communicator WC2 wirelessly receives the connection acknowledge signal CC3. Thus, the second electronic controller EC2 is configured to recognize that the second wireless communicator WC2 is wirelessly connected to the third wireless communicator WC3 based on the connection acknowledge signal CC3.

As seen in FIG. 7, the second electronic controller EC2 and the second wireless communicator WC2 are configured to recognize signals wirelessly transmitted from the third wireless communicator WC3 in the additional connection state. The third electronic controller EC3 and the third wireless communicator WC3 are configured to recognize signals wirelessly transmitted from the second wireless communicator WC2 in the additional connection state.

For example, the third electronic controller EC3 is configured to change the displaying state based on the user input U11 received by the second electric device ED1 in the additional connection state where the third wireless communicator WC3 is paired with the second wireless communicator WC2 and where the third wireless communicator WC3 is wirelessly connected to the second wireless communicator WC2. The third electronic controller EC3 is configured to change the displaying state in response to the additional control signal CS13 wirelessly transmitted from the second wireless communicator WC2 in the additional connection state where the third wireless communicator WC3 is paired with the second wireless communicator WC2 and where the third wireless communicator WC3 is wirelessly connected to the second wireless communicator WC2.

The third electronic controller EC3 is configured to control the third wireless communicator WC3 to wirelessly transmit an acknowledge signal ACK13 to the second wireless communicator WC2 in response to the receipt of the additional control signal CS13. The second electronic controller EC2 and the second wireless communicator WC2 are configured to recognize the acknowledge signal ACK13 in the additional connection state. Thus, the second electronic controller EC2 and the second wireless communicator WC2 recognizes that the second electric device ED1 is in the additional connection state based on the acknowledge signal ACK13. The acknowledge signal ACK13 includes the second pairing information ID2 in the paired state where the third wireless communicator WC3 is paired with the second wireless communicator WC2.

Figure 8:
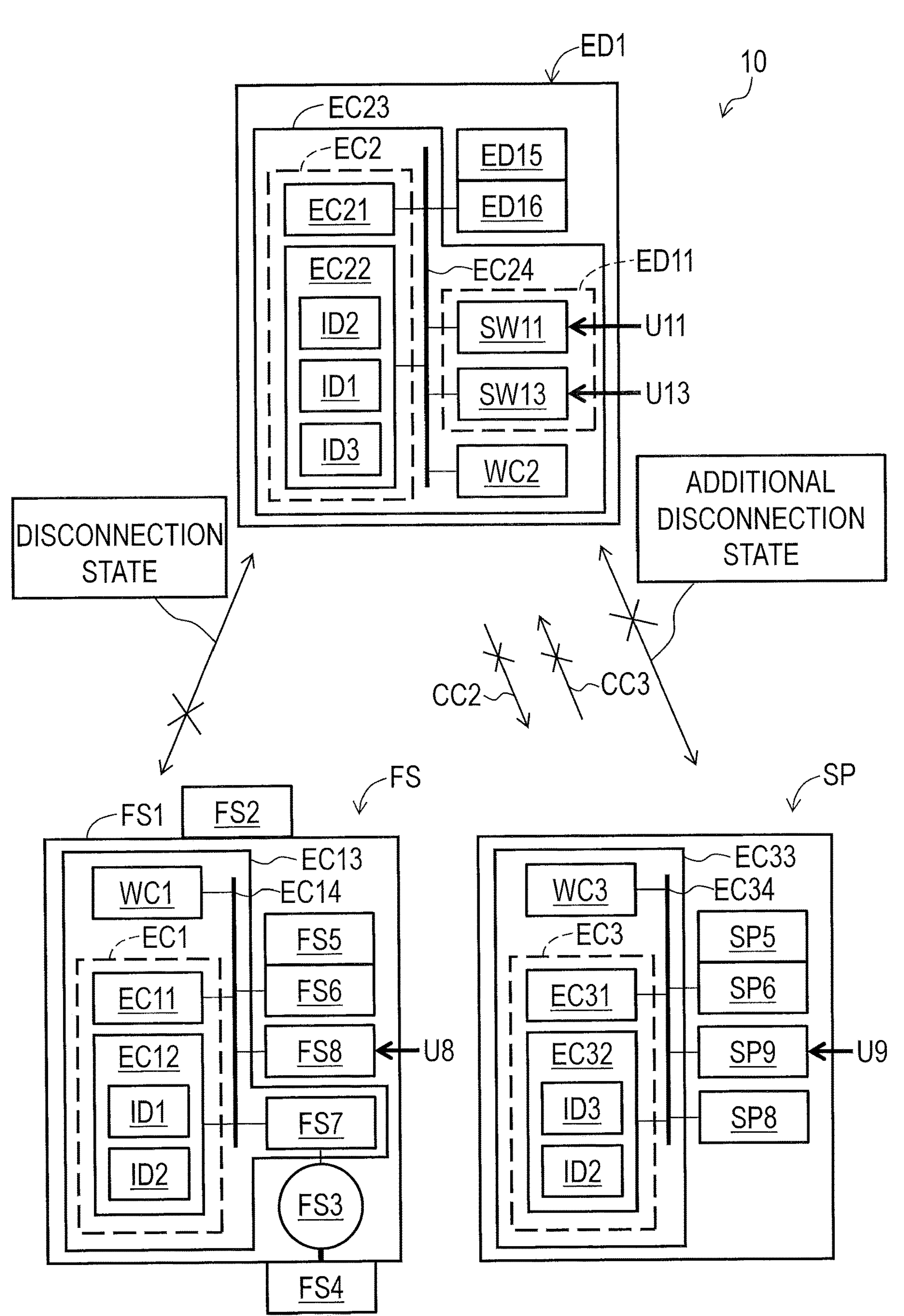

As seen in FIG. 8, the second wireless communicator WC2 is configured to be wirelessly disconnected from the third wireless communicator WC3 based on an additional disconnection operation performed for at least one of the second electric device ED1 and the third electric device SP. The third wireless communicator WC3 is configured to be wirelessly disconnected from the second wireless communicator WC2 based on the disconnection operation performed for at least one of the second electric device ED1 and the third electric device SP.

For example, the additional disconnection operation includes at least one of detaching the second electric power source from the second electric device ED1, turning the second electric device ED1 off, receiving a user disconnection input by the second electric device ED1, detaching the third electric power source from the third electric device SP, turning the third electric device SP off, receiving a user disconnection input by the third electric device SP, and separating one of the second electric device ED1 and the third electric device SP from the other of the second electric device ED1 and the third electric device SP beyond a maximum communication distance.

The second wireless communicator WC2 does not wirelessly transmit the connection signal CC2 in a case where the second electric power source ED15 is detached from the second power source holder ED16, where the second electric device ED1 is turned off, or where the second electric device ED1 receives the user disconnection input. The third wireless communicator WC3 does not wirelessly receive the connection signal CC2 since the second wireless communicator WC2 does not wirelessly transmit the connection signal CC2. Thus, the third electronic controller EC3 recognizes that the third wireless communicator WC3 is wirelessly disconnected from the second wireless communicator WC2 based on lack of the connection signal CC2.

The third wireless communicator WC3 does not wirelessly transmit the connection acknowledge signal CC3 in a case where the third electric power source SP5 is detached from the third power source holder SP6, where the third electric device SP is turned off, or where the third electric device SP receives the user disconnection input. The third wireless communicator WC3 does not wirelessly receive the connection acknowledge signal CC3 since the third wireless communicator WC3 does not wirelessly transmit the connection acknowledge signal CC3. Thus, the third electronic controller EC3 recognizes that the third wireless communicator WC3 is wirelessly disconnected from the third wireless communicator WC3 based on lack of the connection acknowledge signal CC3.

As seen in FIG. 8, the third wireless communicator WC3 is configured to be free of controlling the display unit SP8 to display the information relating to the human-powered vehicle 10 in an additional disconnection state where the third wireless communicator WC3 is paired with the second wireless communicator WC2 and where the third wireless communicator WC3 is wirelessly disconnected from the second wireless communicator WC2. The third wireless communicator WC3 is configured to be free of controlling the display unit SP8 to display the information in the additional disconnection state where the third memory EC32 stores the second pairing information ID2 and where the third wireless communicator WC3 is wirelessly disconnected from the second wireless communicator WC2. The third wireless communicator WC3 is configured to be free of controlling the display unit SP8 to display the information in the additional disconnection state.

The information relating to the human-powered vehicle 2 includes information relating to the second electric device ED1. The information relating to the second electric device ED1 includes information indicative of assignments to the electric switch SW11 and the additional electric switch SW13, information indicative of a remaining level of the electric power source ED5, and information indicative of a version of firmware.

The information relating to the human-powered vehicle 2 includes information relating to the first electric device FS. The third wireless communicator WC3 can be configured to receive the information relating to the first electric device FS from the first electric device FS via the second electric device ED1. The information relating to the first electric device FS includes information indicative of gear positions, information indicative of a remaining level of the first electric power source FS5, and information indicative of a version of firmware.

The additional disconnection state includes a state where the third wireless communicator WC3 is paired with the second wireless communicator WC2 and where the third wireless communicator WC3 is wirelessly disconnected from the second wireless communicator WC2. The additional disconnection state includes a state where the second wireless communicator WC2 is paired with the third wireless communicator WC3 and where the second wireless communicator WC2 is wirelessly disconnected from the third wireless communicator WC3. Namely, the additional disconnection state includes the additional paired state.

The second electric device ED1 is configured to be in the power-off state in a case where the second electric power source is detached from the second electric device ED1 or where the second electric power source is turned off. The third electric device SP is configured to be in the power-off state in a case where the third electric power source is detached from the third electric device SP or where the third electric power source is turned off.

The second electric device ED1 is configured to change a state of the second electric device ED1 from the power-off state to the disconnection state based on the second recovery operation performed for the second electric device ED1.

The third electric device SP is configured to change a state of the third electric device SP from the power-off state to the additional disconnection state based on a third recovery operation performed for the third electric device SP. The recovery operation includes at least one of attaching the third electric power source to the third electric device SP and turning the third electric device SP on.

Figure 9:
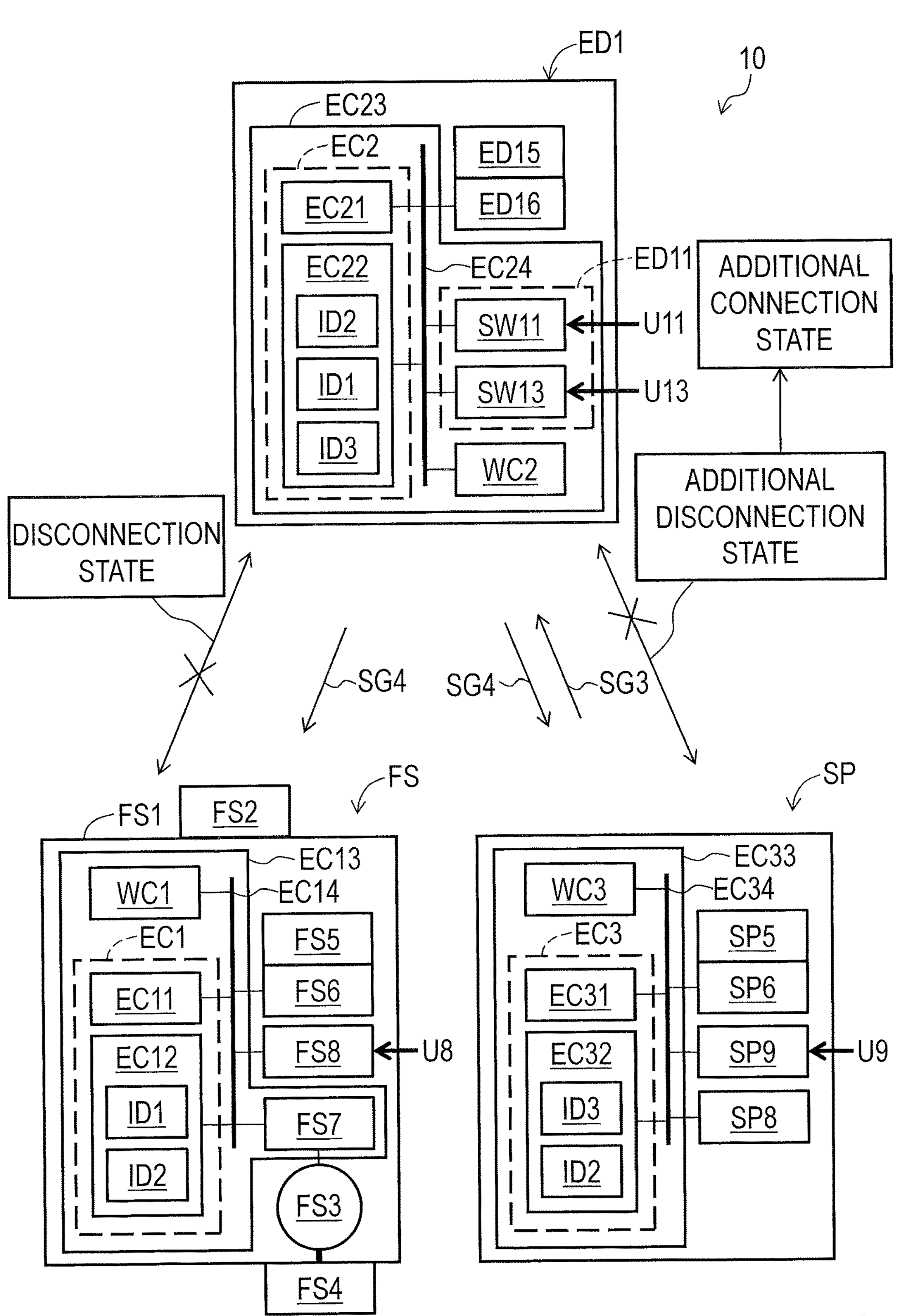

As seen in FIG. 9, the second electronic controller EC2 is configured to control the second wireless communicator WC2 to reconnect to the third wireless communicator WC3 based on the additional user input U13 in the additional disconnection state where the second wireless communicator WC2 is paired with the third wireless communicator WC3 and where the second wireless communicator WC2 is wirelessly disconnected from the third wireless communicator WC3.

For example, the second wireless communicator WC2 is configured to wirelessly transmit a fourth signal SG4 based on the additional user input U13. The second electronic controller EC2 is configured to control the second wireless communicator WC2 to wirelessly transmit the fourth signal SG4 to the third electric device SP based on the additional user input U13 received by the user interface ED11. The second electronic controller EC2 is configured to control the second wireless communicator WC2 to wirelessly transmit the fourth signal SG4 to the third electric device SP based on the additional user input U13 received by the user interface ED11 in the additional disconnection state.

The third electronic controller EC3 is configured to control the third wireless communicator WC3 to reconnect to the second wireless communicator WC2 based on the fourth signal SG4. The third electronic controller EC3 is configured to control the third wireless communicator WC3 to reconnect to the second wireless communicator WC2 in response to receipt of the fourth signal SG4 in the additional disconnection state.

The third electronic controller EC3 is configured to control the third wireless communicator WC3 to wirelessly transmit a third signal SG3 based on the additional user input U13 received by the second electric device ED1 in the additional disconnection state. The third electronic controller EC3 is configured to control the third wireless communicator WC3 to wirelessly transmit the third signal SG3 based on the fourth signal SG4 in the additional disconnection state. The third electronic controller EC3 is configured to control the third wireless communicator WC3 to wirelessly transmit the third signal SG3 in response to receipt of the fourth signal SG4 in the additional disconnection state. For example, the third signal SG3 includes the second pairing information ID2 of the second electric device ED1.

The second electronic controller EC2 is configured to control the second wireless communicator WC2 to reconnect to the third wireless communicator WC3 based on the additional user input U13 in the additional disconnection state where the second wireless communicator WC2 is paired with the third wireless communicator WC3 and where the second wireless communicator WC2 is wirelessly disconnected from the third wireless communicator WC3.

The second electronic controller EC2 is configured to control the second wireless communicator WC2 to reconnect to the third wireless communicator WC3 based on the third signal SG3 wirelessly transmitted from the third wireless communicator WC3 of the third electric device SP in the additional disconnection state. The second electronic controller EC2 is configured to control the second wireless communicator WC2 to reconnect to the third wireless communicator WC3 in response to receipt of the third signal SG3 in the additional disconnection state.

As seen in FIGS. 4 to 6, the second electric device ED1 and the third electric device SP are in the additional disconnection state in a case where the first electric device FS and the second electric device ED1 are in the connection state. As seen in FIGS. 7 to 9, the first electric device FS and the second electric device ED1 are in the disconnection state in a case where the second electric device ED1 and the third electric device SP are in the additional connection state. However, the second electric device ED1 and the third electric device SP can be in the additional connection state in a case where the first electric device FS and the second electric device ED1 are in the connection state if needed or desired.

As seen in FIG. 4, the second wireless communicator WC2 is configured to restrict connecting to the third wireless communicator WC3 based on the additional user input U13 in the connection state where the second wireless communicator WC2 is paired with the first wireless communicator WC1 and where the second wireless communicator WC2 is wirelessly connected to the first wireless communicator WC1. The second wireless communicator WC2 is configured to restrict connecting to the third wireless communicator WC3 based on the additional user input U13 in the connection state where the second wireless communicator WC2 is paired with the first wireless communicator WC1, where the second wireless communicator WC2 is wirelessly connected to the first wireless communicator WC1, and where the third electric device SP stores the second pairing information ID2.

For example, the second wireless communicator WC2 is configured to free of controlling the second wireless communicator WC2 to wirelessly transmit the fourth signal SG4 based on the additional user input U13 in the connection state. The second wireless communicator WC2 is configured to ignore the additional user input U13 in the connection state. The third electronic controller EC3 is configured to be free of controlling the third wireless communicator WC3 to wirelessly transmit the third signal SG3 in the connection state. Thus, the second electronic controller EC2 is configured to control the second wireless communicator WC2 to restrict connecting to the third wireless communicator WC3 based on the additional user input U13 in the connection state.

As seen in FIGS. 4 and 6, the second electronic controller EC2 is configured to control the second wireless communicator WC2 to restrict connecting to the third wireless communicator WC3 based on the user input U11 in the additional disconnection state where the second wireless communicator WC2 is paired with the third wireless communicator WC3 and where the second wireless communicator WC2 is wirelessly disconnected from the third wireless communicator WC3. The second electronic controller EC2 is configured to control the second wireless communicator WC2 to restrict connecting to the third wireless communicator WC3 based on the user input U11 in the disconnection state where the second memory EC22 stores the first pairing information ID1, where the second wireless communicator WC2 is wirelessly disconnected from the third wireless communicator WC3, and where the third electric device SP stores the second pairing information ID2.

As seen in FIG. 4, the second electronic controller EC2 is configured to control the second wireless communicator WC2 to wirelessly transmit the control signal CS11 based on the user input U11 in the connection state. As seen in FIG. 6, the second electronic controller EC2 is configured to control the second wireless communicator WC2 to wirelessly transmit the second signal SG2 based on the user input U11 in the disconnection state.

As seen in FIGS. 4 and 6, however, the second electronic controller EC2 is configured to free of controlling the second wireless communicator WC2 to wirelessly transmit the fourth signal SG4 since the additional user interface ED13 does not receive the additional user input U13. Thus, the second electronic controller EC2 is configured to control the second wireless communicator WC2 to restrict connecting to the third wireless communicator WC3 based on the user input U11 in the additional disconnection state since the third wireless communicator WC3 does not wirelessly transmit the third signal SG3.

As seen in FIG. 7, the second wireless communicator WC2 is configured to restrict connecting to the first wireless communicator WC1 based on the user input U11 in the additional connection state where the second wireless communicator WC2 is paired with the third wireless communicator WC3 and where the second wireless communicator WC2 is wirelessly connected to the third wireless communicator WC3. The second wireless communicator WC2 is configured to restrict connecting to the first wireless communicator WC1 based on the user input U11 in the additional connection state where the second wireless communicator WC2 is paired with the third wireless communicator WC3, where the second wireless communicator WC2 is wirelessly connected to the third wireless communicator WC3, and where the first electric device FS stores the second pairing information ID2.

For example, the second wireless communicator WC2 is configured to free of controlling the second wireless communicator WC2 to wirelessly transmit the second signal SG2 based on the user input U11 in the additional connection state. The second wireless communicator WC2 is configured to ignore the user input U11 in the additional connection state. The first electronic controller EC1 is configured to be free of controlling the first wireless communicator WC1 to wirelessly transmit the first signal SG1 in the additional connection state. Thus, the second electronic controller EC2 is configured to control the second wireless communicator WC2 to restrict connecting to the first wireless communicator WC1 based on the user input U11 in the additional connection state.

As seen in FIGS. 7 and 9, the second electronic controller EC2 is configured to control the second wireless communicator WC2 to restrict connecting to the first wireless communicator WC1 based on the additional user input U13 received by the user interface ED11 in the disconnection state where the second wireless communicator WC2 is paired with the first wireless communicator WC1 and where the second wireless communicator WC2 is wirelessly disconnected from the first wireless communicator WC1. The second electronic controller EC2 is configured to control the second wireless communicator WC2 to restrict connecting to the first wireless communicator WC1 based on the additional user input U13 received by the user interface ED11 in the additional disconnection state where the second wireless communicator WC2 is paired with the third wireless communicator WC3, where the second wireless communicator WC2 is wirelessly disconnected from the third wireless communicator WC3, and where the first electric device FS stores the second pairing information ID2.

As seen in FIG. 7, the second electronic controller EC2 is configured to control the second wireless communicator WC2 to wirelessly transmit the additional control signal CS13 based on the additional user input U13 in the connection state. As seen in FIG. 9, the second electronic controller EC2 is configured to control the second wireless communicator WC2 to wirelessly transmit the fourth signal SG4 based on the additional user input U13 in the disconnection state.

As seen in FIGS. 7 and 9, however, the second electronic controller EC2 is configured to free of controlling the second wireless communicator WC2 to wirelessly transmit the second signal SG2 since the user interface ED11 does not receive the user input U11. Thus, the second electronic controller EC2 is configured to control the second wireless communicator WC2 to restrict connecting to the third wireless communicator WC3 based on the additional user input U13 in the additional disconnection state since the first wireless communicator WC1 does not wirelessly transmit the first signal SG1.

In the present embodiment, the first electric device FS is paired with only the second electric device ED1 while the third electric device SP is paired with only the second electric device ED1. However, the first electric device FS can be configured to be paired with the third electric device SP if needed or desired. The third electric device SP can be configured to be paired with the first electric device FS if needed or desired.

Figure 10:
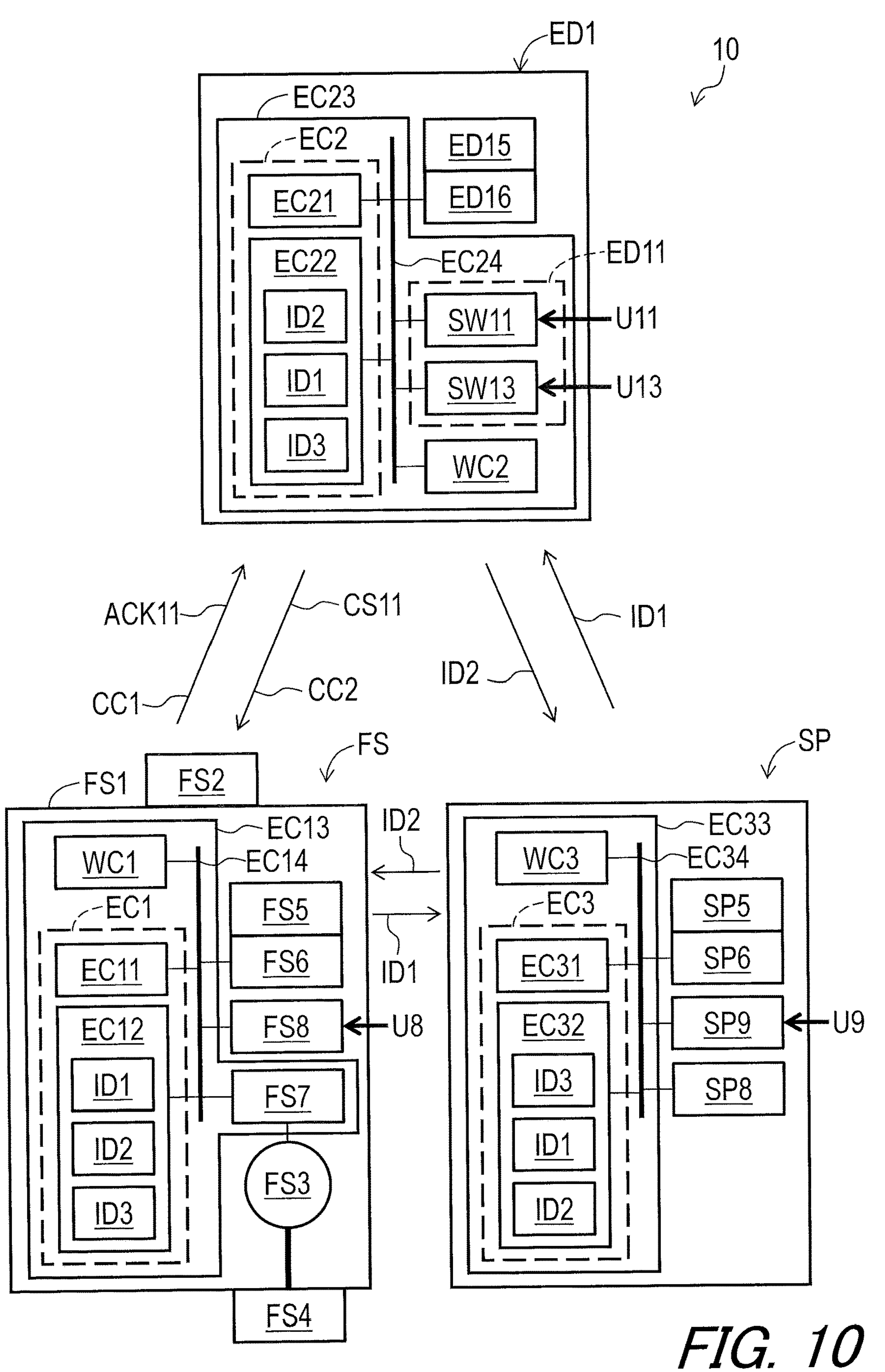
FIG. 10 is a schematic block diagram of a first electric device, a second electric device, and a third electric device of a control system in accordance with a modification.

In the above-mentioned embodiment and the modifications thereof, the second electronic controller EC2 is configured to execute pairing between the first wireless communicator WC1 and the second wireless communicator WC2 without the third electric device SP. As seen in FIG. 10, however, the second electronic controller EC2 can be configured to control the second wireless communicator WC2 to execute pairing between the first wireless communicator WC1 and the second wireless communicator WC2 via the third electric device SP if needed or desired. For example, the third electronic controller EC3 is configured to control the third wireless communicator WC3 to wirelessly transmit the first pairing information ID1 to the second wireless communicator WC2 of the second electric device ED1 in a state where the second electric device ED1 and the third electric device SP are paired. The third electronic controller EC3 is configured to control the third wireless communicator WC3 to wirelessly transmit the second pairing information ID2 to the first wireless communicator WC1 of the first electric device FS in a state where the first electric device FS and the third electric device SP are paired. Thus, the first wireless communicator WC1 and the second wireless communicator WC2 exchange the first pairing information ID1 and the second pairing information ID2 via the third electric device SP. After pairing, the first wireless communicator WC1 and the second wireless communicator WC2 can wirelessly communicate.

In the above-mentioned embodiment or the modifications thereof, the second electric device ED1 corresponds to a peripheral device while the first electric device FS and the third electric device SP correspond to central devices. However, the second electric device ED1 can be configured to correspond to a central device if needed or desired. At least one of the first electric device FS and the third electric device SP can be configured to correspond to a peripheral device if needed or desired.

In the above-mentioned embodiment or the modifications thereof, the communication protocol corresponds to Bluetooth (registered trademark). However, the communication protocol can be a communication protocol other than Bluetooth (registered trademark) if needed or desired.

In the above-mentioned embodiment or the modifications thereof, as seen in FIG. 6, the first electronic controller EC1 is configured to control the first wireless communicator WC1 to wirelessly transmit the first signal SG1 based on the second signal SG2 in the disconnection state. Namely, the transmission of the second signal SG2 corresponds to advertisements includes broadcasting. However, the first electronic controller EC1 can be configured to control the first wireless communicator WC1 to wirelessly transmit the first signal SG1 based on the user input U8 or automatically in the disconnection state if needed or desired. The second wireless communicator WC2 can be configured to wirelessly transmit the second signal SG2 in response to receipt of the first signal SG1. In such modifications, the transmission of the first signal SG1 corresponds to advertisements.

In the above-mentioned embodiment or the modifications thereof, as seen in FIG. 9, the third electronic controller EC3 is configured to control the third wireless communicator WC3 to wirelessly transmit the third signal SG3 based on the fourth signal SG4 in the additional disconnection state. Namely, the transmission of the fourth signal SG4 corresponds to advertisements includes broadcasting. However, the third electronic controller EC3 can be configured to control the third wireless communicator WC3 to wirelessly transmit the third signal SG3 based on the user input U9 or automatically in the additional disconnection state if needed or desired. The second wireless communicator WC2 can be configured to wirelessly transmit the fourth signal SG4 in response to receipt of the third signal SG3. In such modifications, the transmission of the third signal SG3 corresponds to advertisements.

The structures of the first electric device FS can be applied to each of the first electric devices RS, RD, DU, FB, RB, and AS or other devices if needed or desired. The structures of the second electric device ED1 can be applied to each of the second electric devices ED2, ED3, ED4, ED5, ED6, and ED7 or other devices if needed or desired. At least one of the second electric devices ED1, ED2, ED3, ED4, ED5, ED6, and ED7 can be configured to be paired with at least one of the first electric devices FS, RS, RD, DU, FB, RB, and AS if needed or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A first electric device of a human-powered vehicle, the first electric device comprising:

a first wireless communicator configured to wirelessly communicate with a second wireless communicator of a second electric device;

an electric actuator configured to generate an actuation force;

a first electronic controller configured to control the electric actuator to generate the actuation force based on a user input received by the second electric device in a connection state where the first wireless communicator is paired with the second wireless communicator and where the first wireless communicator is wirelessly connected to the second wireless communicator; and the first electronic controller being configured to control the first wireless communicator to reconnect to the second wireless communicator based on the user input received by the second electric device in a disconnection state where the first wireless communicator is paired with the second wireless communicator and where the first wireless communicator is wirelessly disconnected from the second wireless communicator, the user input being different from a pairing request input based on which the second wireless communicator wirelessly transmits a pairing request signal indicating a request to start pairing between the first electric device and the second electric device.

2. The first electric device according to claim 1, wherein the first electronic controller is configured to control the first wireless communicator to wirelessly transmit a first signal based on the user input received by the second electric device in the disconnection state.

3. The first electric device according to claim 2, wherein the second wireless communicator is configured to wirelessly transmit a second signal based on the user input, the first electronic controller is configured to control the first wireless communicator to wirelessly transmit the first signal based on the second signal in the disconnection state, and the first electronic controller is configured to control the first wireless communicator to reconnect to the second wireless communicator based on the second signal.

4. The first electric device according to claim 1, wherein the first electronic controller includes a first memory configured to store second pairing information of the second electric device received during pairing.

5. The first electric device according to claim 1, wherein the first wireless communicator is configured to wirelessly communicate with the second wireless communicator of the second electric device using a communication protocol in the connection state, and the second wireless communicator is configured to wirelessly communicate with a third wireless communicator of a third electric device using the communication protocol in an additional connection state where the second wireless communicator is paired with the third wireless communicator and where the second wireless communicator is wirelessly connected to the third wireless communicator.

6. The first electric device according to claim 1, wherein the first wireless communicator is configured to be wirelessly disconnected from the second wireless communicator based on a disconnection operation performed for at least one of the first electric device and the second electric device.

7. A second electric device of a human-powered vehicle, the second electric device comprising:

a second wireless communicator configured to wirelessly communicate with a first wireless communicator of a first electric device using a communication protocol, the second wireless communicator being configured to wirelessly communicate with a third wireless communicator of a third electric device using the communication protocol;

a user interface configured to receive a user input;

a second electronic controller configured to control the second wireless communicator to reconnect to the first wireless communicator based on the user input in a disconnection state where the second wireless communicator is paired with the first wireless communicator and where the second wireless communicator is wirelessly disconnected from the first wireless communicator; and the second electronic controller being configured to control the second wireless communicator to restrict connecting to the third wireless communicator based on the user input in an additional disconnection state where the second wireless communicator is paired with the third wireless communicator and where the second wireless communicator is wirelessly disconnected from the third wireless communicator, the second electronic controller being configured to control, based on a pairing request input different from the user input, the second wireless communicator to wirelessly transmit a pairing request signal indicating a request to start pairing between the first electric device and the second electric device.

8. The second electric device according to claim 7, wherein the second electronic controller is configured to control the second wireless communicator to wirelessly transmit a second signal to the first electric device based on the user input received by the user interface in the disconnection state.

9. The second electric device according to claim 7, wherein the second electronic controller is configured to control the second wireless communicator to reconnect to the first wireless communicator based on a first signal wirelessly transmitted from the first wireless communicator of the first electric device in the disconnection state.

10. The second electric device according to claim 7, wherein the second wireless communicator is configured to be in at least one of the disconnection state and the additional disconnection state.

11. The second electric device according to claim 7, wherein the second electronic controller includes a second memory configured to store first pairing information of the first electric device received during pairing, and a state where the second wireless communicator is paired with the first wireless communicator includes a state where the second memory stores the first pairing information.

12. The second electric device according to claim 11, wherein the second electronic controller is configured to control the second wireless communicator to reconnect the first wireless communicator of the first electric device based on the user input in the disconnection state where the second memory stores the first pairing information and where the second wireless communicator is wirelessly disconnected from the first wireless communicator.

13. The second electric device according to claim 11, wherein the second electronic controller is configured to control the second wireless communicator to restrict connecting to the third wireless communicator based on the user input in the disconnection state where the second memory stores the first pairing information, where the second wireless communicator is wirelessly disconnected from the third wireless communicator, and where a third electric device stores the second pairing information.

14. The second electric device according to claim 11, wherein the second memory is configured to store the first pairing information of the first electric device received during pairing executed between the first electric device and the second electric device, and the second memory is configured to store third pairing information of the third electric device received during pairing executed between the second electric device and the third electric device.

15. The second electric device according to claim 7, wherein the second electronic controller is configured to control the second wireless communicator to execute pairing between the first wireless communicator and the second wireless communicator via the third electric device.

16. The second electric device according to claim 7, wherein the second electronic controller is configured to execute pairing between the first wireless communicator and the second wireless communicator without the third electric device.

17. The second electric device according to claim 7, wherein the third electric device includes at least one of a smartphone and a cycle computer.

18. A second electric device of a human-powered vehicle, the second electric device comprising:

a second wireless communicator configured to wirelessly communicate with a first wireless communicator of a first electric device using a communication protocol, the second wireless communicator being configured to wirelessly communicate with a third wireless communicator of a third electric device using the communication protocol;

a user interface configured to receive a user input;

a second electronic controller configured to control the second wireless communicator to reconnect to the first wireless communicator based on the user input in a disconnection state where the second wireless communicator is paired with the first wireless communicator and where the second wireless communicator is wirelessly disconnected from the first wireless communicator; and the second electronic controller being configured to control the second wireless communicator to restrict connecting to the third wireless communicator based on the user input in an additional disconnection state where the second wireless communicator is paired with the third wireless communicator and where the second wireless communicator is wirelessly disconnected from the third wireless communicator, the user interface is configured to receive an additional user input different from the user input, and the second electronic controller is configured to control the second wireless communicator to restrict connecting to the first wireless communicator based on the additional user input received by the user interface in the disconnection state.

19. The second electric device according to claim 18, wherein the second wireless communicator is configured to restrict connecting to the third wireless communicator based on the additional user input in a connection state where the second wireless communicator is paired with the first wireless communicator and where the second wireless communicator is wirelessly connected to the first wireless communicator.

20. The second electric device according to claim 18, wherein the second wireless communicator is configured to restrict connecting to the first wireless communicator based on the user input in the additional connection state.

21. The second electric device according to claim 18, wherein the second wireless communicator is configured to be wirelessly disconnected from the third wireless communicator based on an additional disconnection operation performed for at least one of the second electric device and the third electric device.

22. The second electric device according to claim 18, wherein the second electronic controller is configured to control, based on a pairing request input, the second wireless communicator to wirelessly transmit a pairing request signal indicating a request to start pairing between the first electric device and the second electric device, and the pairing request input is the same manner as the additional user input.

23. The second electric device according to claim 18, wherein the second electronic controller is configured to control the second wireless communicator to reconnect to the third wireless communicator based on the additional user input in the additional disconnection state.

24. A control system of a human-powered vehicle, the control system comprising:

a first electric device; and the second electric device according to claim 7; and the first electric device comprising;

a first wireless communicator configured to wirelessly communicate with the second wireless communicator of the second electric device; and an electric actuator configured to generate an actuation force.

25. The control system according to claim 24, wherein the first electric device is configured to be mounted to a vehicle body of the human-powered vehicle, and the second electric device is configured to be mounted to the vehicle body of the human-powered vehicle.

* * * * *